United States Patent
Revesz et al.

(10) Patent No.: US 10,482,117 B2
(45) Date of Patent: *Nov. 19, 2019

(54) SYSTEMS AND METHODS FOR CATEGORIZING AND MODERATING USER-GENERATED CONTENT IN AN ONLINE ENVIRONMENT

(71) Applicant: Oath Inc., Dulles, VA (US)

(72) Inventors: Jeffrey Revesz, Brooklyn, NY (US); Christopher Wiggins, New York, NY (US)

(73) Assignee: Oath Inc., Dulles, VA (US)

( * ) Notice: Subject to any disclaimer, the term of this patent is extended or adjusted under 35 U.S.C. 154(b) by 37 days.

This patent is subject to a terminal disclaimer.

(21) Appl. No.: 15/791,099

(22) Filed: Oct. 23, 2017

(65) Prior Publication Data

US 2018/0081965 A1 Mar. 22, 2018

Related U.S. Application Data

(63) Continuation of application No. 14/617,402, filed on Feb. 9, 2015, now Pat. No. 9,824,141, which is a continuation of application No. 13/112,556, filed on May 20, 2011, now Pat. No. 8,954,316.

(51) Int. Cl.
*H04L 12/58* (2006.01)
*G06F 16/35* (2019.01)
*G06F 16/951* (2019.01)

(52) U.S. Cl.
CPC .......... *G06F 16/353* (2019.01); *G06F 16/951* (2019.01); *H04L 51/12* (2013.01); *H04L 51/32* (2013.01)

(58) Field of Classification Search
CPC ...................................................... H04L 51/12

USPC ............................................................ 704/9
See application file for complete search history.

(56) References Cited

U.S. PATENT DOCUMENTS

| | | | |
|---|---|---|---|
| 7,974,714 B2 | 7/2011 | Hoffberg |
| 8,020,111 B2 | 9/2011 | Horvitz et al. |
| 8,031,060 B2 | 10/2011 | Hoffberg et al. |
| 8,862,521 B2 | 10/2014 | Revesz |

(Continued)

FOREIGN PATENT DOCUMENTS

EP   2 182 451 A1   5/2010

OTHER PUBLICATIONS

Fasel, "AdaBoost—Freund and Schaipre: Experiments with a New Boosting Algorithm; Schapire and Singer: Improved Boosting Algorithms Using Confidence-Rated Predictions," Oct. 23, 2001, 25 pages.

(Continued)

*Primary Examiner* — Susan I McFadden
(74) *Attorney, Agent, or Firm* — Bookoff McAndrews, PLLC

(57) ABSTRACT

Exemplary embodiments provide systems, devices and methods for computer-based categorization and moderation of user-generated content for publication of the content in an online environment. Exemplary embodiments automatically determine a probability value indicating that the user-generated content is either a positive example or a negative example of one or more unsuitable categories. If the user-generated content is determined to be a positive example of any of the unsuitable categories to a predefined degree of certainty, exemplary embodiments may automatically exclude the content from publication in the online environment.

20 Claims, 17 Drawing Sheets

(56) References Cited

U.S. PATENT DOCUMENTS 8,954,316 B2  2/2015  Revesz et al.
9,224,155 B2  12/2015 Revesz

OTHER PUBLICATIONS

Favre et al., "Icsiboost," http://code.google.com/p/icsiboost, 2007, 2 pages.
Freund, "An Improved Boosting Algorithm and Its Implications on Learning Complexity," Proceedings of the Fifth Annual Workshop on Computational Learning Theory, pp. 391-398, 1992.
Freund, "An Adaptive Version of the Boost by Majority Algorithm," Machine Learning, vol. 3, No. 3, pp. 293-318, 2001.
Freund et al., "A Short Introduction to Boosting," Journal of Japanese Society for Artificial Intelligence, vol. 14, No. 5, pp. 771-780, Sep. 1999.
Freund et al., "Experiments with a New Boosting Algorithm," Machine Learning: Proceedings of the Thirteenth International Conference, pp. 148-156, 1996.
Schapire, "Theory and Applications of Boosting," Neural Information Processing Systems Foundation Conference, Dec. 3, 2007, 104 pages.
International Search Report and Written Opinion of corresponding International Application No. PCT/US2012/038064, dated Aug. 2, 2012, 14 pages.
Sebastiani, Fabrizio, "Machine Learning in Automated Text Categorization," ACM Computing Surveys, ACM, vol. 34, No. 1, pp. 1-47 (Mar. 1, 2002).
Arnt et al., "Learning to Perform Moderation in Online Forums," Proceedings of the IEEE/WIC International Conference on Web Intelligence, pp. 1-4 (2003).

| UserID | #Comments | #AutoExcluded | #AutoPublished | Score and expertise status for "abusive" category | Score for "racist" category | Score for "sexist" category | Overall Expertise Status | Warned? | Flagged? | Banned? |
|---|---|---|---|---|---|---|---|---|---|---|
| 9834 | 10 | 0 | 9 | 0.1 Expert | 0.2 Expert | 0.0 Expert | Expert | N | N | N |
| 532 | 15 | 15 | 0 | 0.9 Problem | 0.8 Problem | 0.5 - | Problem | Y | Y | Y |
| 6547 | 5 | 1 | 2 | 0.5 - | 0.4 - | 0.6 - | - | Y | N | N |
| ... | ... | ... | ... | ... | ... | ... | ... | ... | ... | ... |
| ... | ... | ... | ... | ... | ... | ... | ... | ... | ... | ... |

*Figure 2*

SYSTEMS AND METHODS FOR CATEGORIZING AND MODERATING USER-GENERATED CONTENT IN AN ONLINE ENVIRONMENT

CROSS-REFERENCE TO RELATED APPLICATIONS

This application is a continuation of and claims the benefit of priority to U.S. application Ser. No. 14/617,402, filed Feb. 9, 2015 (now allowed), which is a continuation of U.S. application Ser. No. 13/112,556, filed May 20, 2011 (now U.S. Pat. No. 8,954,316), the disclosures of which are expressly incorporated herein by reference to their entireties.

TECHNICAL FIELD

Exemplary embodiments relate to online (for example, web-based) content delivery systems. In particular, exemplary embodiments relate to systems and methods for categorizing and moderating user-generated content in an online environment.

BACKGROUND

Many types of Internet websites, such as blogs and forums, allow for publication of user-generated content. Also, such websites frequently allow for moderation of user-generated content. For example, such systems may assess the nature of the content and moderate publication of such content based upon the unsuitability of the content. User-generated content may be assessed, for example, to determine whether the content is of an abusive or otherwise unsuitable nature for publication on the website. User-generated content found to be unsuitable for publication may be prevented from an initial publication or may be removed from the website after an initial publication.

Some conventional moderation systems use supervisor-based (i.e., human) moderation, whereby one or more persons with special privileges enforces moderation policies. Other systems use user moderation, whereby users moderate content generated by other users. Still further moderation systems use a combination of supervisor and user moderation. However, the reliance on human moderators in existing systems tends to make the moderation process time-consuming and error-prone. Human moderators of highly popular websites, for example, may be unable to keep pace with a fast influx of content generated by users, which may result in long delays in publication of the user-generated content or in inadequate or error-prone moderation.

SUMMARY

Exemplary embodiments relate to systems and methods for categorizing and moderating user-generated content in an online environment, such as user comments to be published on a web page, in a blog, and the like. The system automatically categorizes the type of content to be published, and determines whether it is suitable for publication.

In accordance with one exemplary embodiment, a computer-executable method is provided for moderating publication of textual content in an online environment. The method includes receiving at a computer system text to be published in an online environment, and processing the text at the computer system using a machine learning system implementing a machine learning algorithm embodied on one or more computer-readable media to calculate a first numeric likelihood that the text falls into a first selected category unsuitable for publication. The method also includes comparing the first numeric likelihood to a first set of threshold values associated with the first selected category and stored in a database of the computer system, and determining whether to electronically publish the text in the online environment or exclude the text from publication based on the comparison of the first numeric likelihood to the first set of threshold values.

In accordance with another exemplary embodiment, a computer-executable method is provided for assigning an expertise level to a user in an online environment. The method includes receiving at a computer system a set of texts generated by the user. The method includes processing the set of texts at the computer system using a machine learning system implementing a machine learning algorithm embodied on one or more computer-readable media, the machine learning system analyzing a sequence of n-grams in the set of texts and calculating a first set of likelihoods corresponding to the likelihood of the set of texts falling into a first selected category unsuitable for publication. The method also includes assigning an expertise level to the user based on the first set of likelihoods, and electronically indicating the expertise level of the user in the online environment.

In accordance with another exemplary embodiment, one or more non-transitory computer-readable media are provided. The compute-readable media are encoded with computer-executable instructions for performing a method for moderating publication of textual content in an online environment. The method includes receiving at a computer system text to be published in an online environment, and processing the text at the computer system using a machine learning system implementing a machine learning algorithm embodied on one or more computer-readable media to calculate a first numeric likelihood that the text falls into a first selected category unsuitable for publication. The method also includes comparing the first numeric likelihood to a first set of threshold values associated with the first selected category and stored in a database of the computer system, and determining whether to electronically publish the text in the online environment or exclude the text from publication based on the comparison of the first numeric likelihood to the first set of threshold values.

In accordance with another exemplary embodiment, one or more non-transitory computer-readable media are provided. The compute-readable media are encoded with computer-executable instructions for performing a method for assigning an expertise level to a user in an online environment. The method includes receiving at a computer system a set of texts generated by the user. The method includes processing the set of texts at the computer system using a machine learning system implementing a machine learning algorithm embodied on one or more computer-readable media, the machine learning system analyzing a sequence of n-grams in the set of texts and calculating a first set of likelihoods corresponding to the likelihood of the set of texts falling into a first selected category unsuitable for publication. The method also includes assigning an expertise level to the user based on the first set of likelihoods, and electronically indicating the expertise level of the user in the online environment.

BRIEF DESCRIPTION OF THE DRAWINGS

The foregoing and other objects, aspects, features and advantages of exemplary embodiments will be more fully understood from the following description when read together with the accompanying drawings, in which:

FIG. 2 is a diagram showing an exemplary database table according to exemplary embodiments for storing information about user-generated content.

DETAILED DESCRIPTION

Figure 1:
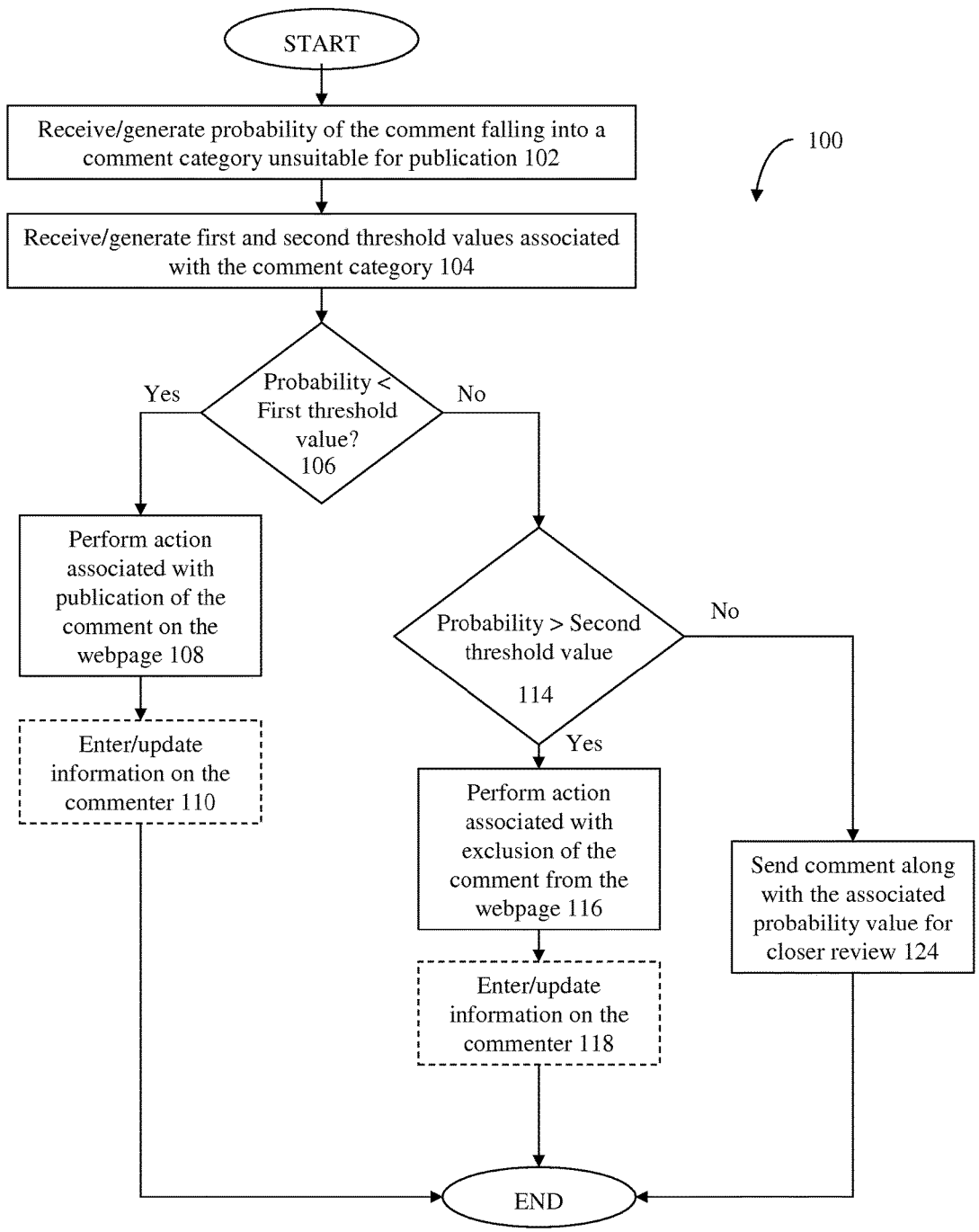
FIG. 1 is a flowchart showing an exemplary computer-implemented and computer-executable method according to exemplary embodiments for categorizing and moderating publication of user-generated content.

Exemplary embodiments address deficiencies of conventional online comment moderation systems. Exemplary embodiments provide systems, devices and methods for computer-based categorization and moderation of user-generated content before publication of the content on a web page. In exemplary embodiments, the moderation process may include, but is not limited to, automatically publishing content that is unlikely to be unsuitable for publication and automatically excluding from publication content that is likely to be unsuitable for publication.

Exemplary embodiments may specify one or more categories of textual content that are unsuitable for publication. An exemplary category may further include one or more content sub-categories. Exemplary categories and sub-categories may be provided for unsuitable content including, but not limited to, abusive content, homophobic content, racist content, sexist content, spam content, and the like. In an exemplary embodiment, the exemplary "abusive" category may include exemplary sub-categories of "racist," "sexist," "homophobic," and the like.

Exemplary embodiments may provide computing systems, computing devices and computer-executable methods which implement machine learning tools to automatically analyze the textual content generated by a user prior to publication on a web page. The user-generated content may include free-text content or content conforming to any particular format. Based on the analysis, exemplary embodiments may determine the likelihood that the user-generated content is either a positive example or a negative example of one or more categories and/or sub-categories that are unsuitable for publication on the web page. If the user-generated content is determined to be a positive example of any of the unsuitable categories and/or sub-categories to a predefined degree of certainty, exemplary embodiments may automatically exclude the content from publication on the web page. If the user-generated content is determined to be a negative example of all of the unsuitable categories and/or sub-categories to a predefined degree of certainty, exemplary embodiments may automatically include the content for publication on the web page.

Because exemplary embodiments allow automatic computer-based moderation, the moderation process is fast-paced (for example, in real time) and is capable of keeping pace with a fast influx of user-generated content that is experienced for popular websites. In addition, exemplary embodiments are capable of reliably determining a likelihood that the user-generated content falls into one or more categories of text that are unsuitable for publication on the web page, thus avoiding introduction of human error that is otherwise experienced in moderation systems that rely on human moderators.

Exemplary embodiments may perform fully automatic moderation, for example, by automatically determining whether to publish user-generated content. In some exemplary embodiments, human review may be used along with automatic computer-based tools to determine whether to publish the content on the web page, and/or to confirm a decision taken by the automatic tools on publishing the content on the web page. Exemplary embodiments may perform automatic moderation with optional user involvement and supervision, for example, by requesting a user to confirm whether to publish or to exclude from publication user-generated content in certain cases.

I. DEFINITIONS

Certain terms are defined in this section to facilitate understanding of exemplary embodiments.

The term "set" refers to a collection of one or more items.

The terms "reference corpus," "reference database," and "reference examples" refer to a collection of textual examples that, for a particular category of content, are classified as either positive or negative examples of that particular category. A reference database may contain a collection of positive or negative textual examples for a single category or for a plurality of textual categories.

The term "n-gram" refers to a sub-sequence of n consecutive textual items from a particular textual sequence. An n-gram of size one is referred to as a "unigram, an n-gram of size two is referred to as a "bigram" and an n-gram of size three is referred to as a "trigram," and the like.

The term "feature" refers to an n-gram. Textual features may be sorted into n-gram sub-sequences for processing by a machine learning system implementing a machine learning algorithm embodied on one or more computer-readable media. Features used to sort textual features may include different types of n-grams, for example, unigrams and bigrams, unigrams and bigrams and trigrams, and the like.

The term "stop word" refers to a word, a collection of words or any other textual feature that is highly common in natural language text and that does not contribute to the predictive value of determining whether a piece of text is a positive or a negative example of a selected category. A collection of stop words usable in accordance with exemplary embodiments may be predefined and updated by a user. Exemplary stop words may include, but are not limited to, "a," "the," and the like.

The term "vector" refers to a representation of a particular textual content as a vector in a hyperspace. The hyperspace may be a multi-dimensional space to which a text categorization problem is mapped in order to facilitate a machine learning system implementing a machine learning algorithm embodied on one or more computer-readable media to process and analyze the problem. Exemplary vectors may be generated and processed by a computing device, a computing system and/or a computer-executable method.

The term "training vector" refers to a vector that is used in training a machine learning system implementing a machine learning algorithm embodied on one or more computer-readable media.

The term "testing vector" refers to a vector that is used in testing a trained machine learning system implementing a machine learning algorithm embodied on one or more computer-readable media.

The term "weak learner" refers to a computer-implemented and computer-executable textual classifier that follows a set of one or more rules to classify any given piece of text into a positive or a negative example of a selected category.

The term "machine learning system" refers to a computing system implementing a machine learning algorithm embodied on one or more computer-readable media.

The term "boosting algorithm" refers to a computer-implemented and computer-executable method for improving the accuracy of a machine learning system implementing a machine learning algorithm encoded on one or more computer-readable media. Exemplary boosting algorithms usable in accordance with exemplary embodiments may include, but are not limited to, the AdaBoost, icsiboost, textbooster algorithms.

The term "boosting system" refers to a computing system implementing one or more exemplary boosting algorithms embodied on one or more computer-readable media.

II. EXEMPLARY EMBODIMENTS

Exemplary embodiments are described below with reference to the drawings. One of ordinary skill in the art will recognize that exemplary embodiments are not limited to the illustrative embodiments, and that components of exemplary systems, devices methods are not limited to the illustrative embodiments described below.

FIG. 1 is a flowchart showing an exemplary computer-implemented and computer-executable method 100 to determine whether to publish specific user-generated content, for example, a comment to be posted on a website. In an exemplary embodiment, the method 100 may perform fully automatic moderation, for example, by automatically determining whether to publish user-generated content. In another exemplary embodiment, the method 100 may perform automatic moderation with optional user involvement and supervision, for example, by requesting a user to confirm whether to publish or to exclude from publication user-generated content in some or all cases.

In step 102, exemplary embodiments may receive an indication of whether the content is unsuitable for publication on a web page. Alternatively, in step 102, exemplary embodiments may analyze the content to generate an indication of whether the content is unsuitable for publication on a web page. The indication may be generated by a trained machine learning system implementing a machine learning algorithm and a boosting algorithm embodied on one or more computer-readable media. Exemplary indications may take any form suitable for use in method 100 including, but not limited to, one or more quantitative indications (for example, one or more probability values) that indicate the likelihood that the content is a positive or negative examples of one or more categories of content that are suitable and/or unsuitable for publication on a web page.

In an exemplary embodiment in which a probability value is used as an indication that the content is a positive example of an unsuitable category, a higher probability value indicates a higher likelihood that the content is unsuitable for publication. Similarly, in an exemplary embodiment in which a probability value is used as an indication that the content is a negative example of an unsuitable category, a higher probability value indicates a higher likelihood that the content is not unsuitable for publication.

In an exemplary embodiment in which the content is categorized based on a single unsuitable category, the content has a single associated probability value for the category. For example, the content may have a probability value associated with an "abusive" category of 0.3. In another exemplary embodiment in which the content is categorized based on two or more unsuitable categories, the content has an associated probability value for each unsuitable category. For example, the content may have a probability value associated with the "sexist" category of about 0.5 and a probability value associated with a "racist" category of about 0.0.

In step 104, exemplary embodiments may receive or generate one or more threshold values associated with each unsuitable category. The threshold values may be used to automatically determine if the probability value associated with a particular content is sufficiently high to warrant automatic exclusion from publication of the content, and/or to determine if the probability value is sufficiently low to warrant automatic publication of the content. In an exemplary embodiment, the threshold values may be predefined values associated with the category. In an exemplary embodiment, the threshold values may be determined based on an analysis of the distribution of publication-suitable and publication-unsuitable content in a reference corpus over varying threshold values.

For example, if it is determined that, among a plurality of content examples in the reference corpus, all of the content examples having probability values below a particular threshold value are not in the unsuitable category, then that threshold value may be used as a first lower threshold value in exemplary embodiments. Similarly, if it is determined that, among a plurality of content examples in the reference corpus, all of the content examples having probability values above a particular threshold value are in the unsuitable category, then that threshold value may be used as a second higher threshold value in exemplary embodiments. The second higher threshold value may indicate a probability value at or above which the content is very likely be a positive example of the unsuitable comment category and, therefore, is likely to be unsuitable for publication. The first lower threshold value may indicate a probability value at or below which the content is unlikely be a positive example of the unsuitable category and, therefore, is very unlikely to be unsuitable for publication.

In an exemplary embodiment, the one or more threshold values may be set to the same value over all of the unsuitable categories. In another exemplary embodiment, the threshold values may set to different values for different unsuitable categories, for example, the threshold values may be lower for a more inflammatory category like "racist," the threshold values may be higher for a more general category like "abusive."

In steps 106 and 114, exemplary embodiments may compare the probability values associated with a particular content falling into one or more unsuitable categories against the threshold values associated with the categories. In an exemplary embodiment, a lower first threshold value and a lower second threshold value may be used for each unsuitable category.

In this exemplary embodiment, in step 106, exemplary embodiments may determine if the probability values associated with the content associated with one or more categories are all lower than the first lower threshold values associated with the unsuitable categories. Alternatively, exemplary embodiments may determine if the probability values associated with the content associated with one or more categories are all equal to or lower than the first lower threshold values associated with the unsuitable categories.

In an exemplary embodiment in which a single category is used, the content has a single probability value associated with that category (for example, that the content has a probability value of 0.45 of falling in the "abusive" category). In this exemplary embodiment, step 106 compares the single probability value with the first lower threshold value associated with the single category (for example, compares 0.45 with a first lower threshold value of 0.4 for the "abusive" category).

If the single probability value is lower than the first lower threshold value associated with the single category, this indicates that it is very likely that the content is not unsuitable for publication and that the content may be automatically published on the web page (by taking the "Yes" branch). Alternatively, if the single probability value is lower than or equal to the first lower threshold value associated with the single category, this indicates that it is very likely that the content is not unsuitable for publication and that the content may be automatically published on the web page (by taking the "Yes" branch). Otherwise, the content is not suitable for automatic publication, and the "No" branch is taken.

In another exemplary embodiment in which two or more categories are used, the content has two or more associated probability values, each probability value associated with one of the categories (for example, that the comment has a probability value of 0.3 of falling into the "homophobic" category and a probability value of 0.1 of falling into the "sexist" category). In this exemplary embodiment, step 106 compares the probability value associated with each category with the first lower threshold value associated with that particular category (for example, compares 0.3 with a first lower threshold value of 0.2 for the "homophobic" category, and compares 0.1 with a first lower threshold value of 0.3 for the "sexist" category).

If the probability value for each unsuitable category is lower than the first lower threshold value of that category, this indicates that it is likely that the content, is not unsuitable for publication and that the content may be automatically published on the web page (by taking the "Yes" branch). That is, the probability values for all of the categories must meet the lower-than-first-threshold requirement for automatic publication of the content. Alternatively, if the probability value for each unsuitable category is lower than or equal to the first lower threshold value of that category, this indicates that it is likely that the content is not unsuitable for publication and that the content may be automatically published on the web page (by taking the "Yes" branch). Otherwise, the content is not suitable for automatic publication, and the "No" branch is taken.

In an exemplary embodiment, the decision on whether to automatically publish the user-generated content on the web page may be based on whether the user-generated content is a negative example of one or more unsuitable categories. In another exemplary embodiment, the decision on whether to automatically publish the user-generated content on the web page may be based on whether the user-generated content is a negative example of one or more unsuitable categories and also on a category of the textual content of the web page. The category of the web page may be determined by an exemplary machine learning system implementing a machine learning algorithm and a boosting algorithm embodied on one or more computer-readable media.

In step 108, one or more actions associated with the automatic publication of the content may be performed. The one or more actions may include, but are not limited to, automatically publishing the content on the web page, scheduling automatic publication of the content on the web page, designating the content for automatic publication on the web page, and the like.

Optionally, in step 110, exemplary embodiments may enter or update information associated with the user who generated the content based on the automatic publication of the content. Exemplary user information may include, but is not limited to, the total quantity of content generated by the user that has automatically been published, and/or the average probability values associated with one or more unsuitable categories for the user's generated content.

Returning to step 106, if the "No" branch is taken, this indicates that there is a sufficient likelihood that the content may be unsuitable for publication on the web page. In this exemplary embodiment, in step 114, exemplary embodiments may determine if the probability values of the content associated with one or more categories are higher than the second higher threshold values associated with the categories. Alternatively, exemplary embodiments may determine if the probability values of the content associated with one or more categories are higher than or equal to the second higher threshold values associated with the categories.

In an exemplary embodiment in which a single category is used, the content has a single probability value associated with that category (for example, that the content has a probability value of 0.45 of falling in the "abusive" category). In this exemplary embodiment, step 114 compares the single probability value with the second higher threshold value associated with the single category (for example, compares 0.45 with a second higher threshold value of 0.9 for the "abusive" category).

If the single probability value is higher than the second higher threshold value associated with the single category, this indicates that it is likely that the content is unsuitable for publication and the content may be automatically excluded from publication on the web page (by taking the "Yes" branch). Alternatively, if the single probability value is higher than or equal to the second higher threshold value associated with the single category, this indicates that it is likely that the content is unsuitable for publication and the content may be automatically excluded from publication on the web page (by taking the "Yes" branch). Otherwise, the content may require closer review, and the "No" branch is taken.

In another exemplary embodiment in which two or more categories are used, the content has two or more associated probability values, each probability value associated with one of the categories (for example, that the content has a probability value of 0.3 of falling into the "homophobic" category and a probability value of 0.1 of falling into the "sexist" category). In this exemplary embodiment, step 114 compares the probability value associated with each category with the second higher threshold value associated with that particular category (for example, compares 0.3 with a second higher threshold value of 0.75 for the "homophobic" category, and compares 0.1 with a second higher threshold value of 0.8 for the "sexist" category).

If the probability value associated with any category is higher than the second higher threshold value of that category, this indicates that it is likely that the content is unsuitable for publication and that the content may be automatically excluded from publication on the web page (by taking the "Yes" branch). That is, the content may be automatically excluded from publication if the probability value for any of the categories meets the higher-than-second-threshold requirement. Alternatively, if the probability value associated with any category is higher than or equal to the second higher threshold value of that category, this indicates that it is likely that the content is unsuitable for publication and that the content may be automatically excluded from publication on the web page (by taking the "Yes" branch). Otherwise, the content may require closer review, and the "No" branch is taken.

In an exemplary embodiment, the decision on whether to automatically exclude the user-generated content from publication on the web page may be based on whether the user-generated content is a positive example of one or more unsuitable categories. In another exemplary embodiment, the decision on whether to automatically exclude the user-generated content from publication on the web page may be based on whether the user-generated content is a positive example of one or more unsuitable categories and also on a category of the textual content of the web page. For example, certain user-generated comments that may be unsuitable for a web page marketed to teenagers may be suitable for a web page marketed to adults. The category of the web page may be determined by an exemplary machine learning system implementing a machine learning algorithm and a boosting algorithm embodied on one or more computer-readable media.

In step 116, one or more actions associated with the automatic exclusion of the content from publication may be performed. The one or more actions may include, but are not limited to, automatically discarding the content, automatically publishing the web page without the content, automatically designating the content as being unsuitable for publication, and the like.

Optionally, in step 118, exemplary embodiments may enter or update information associated with the user who generated the content based on the automatic publication of the content. Exemplary user information may include, but are not limited to, the total number of content generated by the user that were automatically excluded from publication, the average probability values associated with one or more unsuitable categories for the user's generated content, and the like.

Returning to step 114, if the "No" branch is taken, this indicates that it is unclear if the content is suitable or unsuitable for publication on the web page. In step 124, exemplary embodiments may send the content along with the associated probability value or score to a human review who may reads the content and decide whether to publish the content.

FIG. 2 illustrates an exemplary database structure 200 (for example, a database table) for storing information on users (for example, commenters) who generate web page content. One of ordinary skill in the art will appreciate that the database structure 200 of FIG. 2 is merely illustrative and that any suitable storage structure may be used to store user information. One of ordinary skill in the art will also appreciate that the types of information shown in FIG. 2 are illustrative and that any type of information may be stored with respect to any user in database structure 200.

The database structure 200 may be structured as a table and may include a table entry for each user who generates content for the web page. The database structure 200 may include one or more columns including, but not limited to, a column 202 for storing a unique ID for a user, a column 204 for storing the total number of comments generated by the user, a column 206 for storing the total number of comments generated by the user that were automatically excluded from publication by a trained machine learning system implementing a machine learning algorithm embodied on one or more computer-readable media, and a column 208 for storing the total number of comments generated by the user that were automatically published by a trained machine learning system implementing a machine learning algorithm embodied on one or more computer-readable media.

The database structure 200 may include suitability information on each user's comments. In an exemplary embodiment, the database structure 200 may include suitability or unsuitability scores for each of the user's comments, which may be based on the probability values associated with the comments. In an exemplary embodiment, the database structure 200 may include average suitability or unsuitability scores for the user's comments in each unsuitable category, for example, in a column 210 (for the unsuitable category "abusive"), column 212 (for the unsuitable category "racist"), column 214 (for the unsuitable category "sexist"). The database structure 200 may also include an expertise level (for example, whether the user is a "problem" user or an "expert" user) assigned to the user in each unsuitable category, for example, in a column 210 (for the unsuitable category "abusive"), column 212 (for the unsuitable category "racist"), column 214 (for the unsuitable category "sexist"). The database 200 may also include an overall expertise level (for example, whether the user is a "problem" user or an "expert" user) assigned to the user over all unsuitable categories, for example, in a column 216.

In exemplary embodiments, the database structure 200 may include a column 218 indicating whether the user has been warned for unsuitable comments, a column 220 indicating whether the user has been flagged for unsuitable comments, a column 222 indicating whether the user has been banned from generating comments, and the like.

Exemplary embodiments may use a trained machine learning system implementing a machine learning algorithm embodied on one or more computer-readable media for analyzing user-generated content and generating a probability value associated with the content. The probability value may indicate the likelihood that the content falls into a particular unsuitable category.

Figure 3:
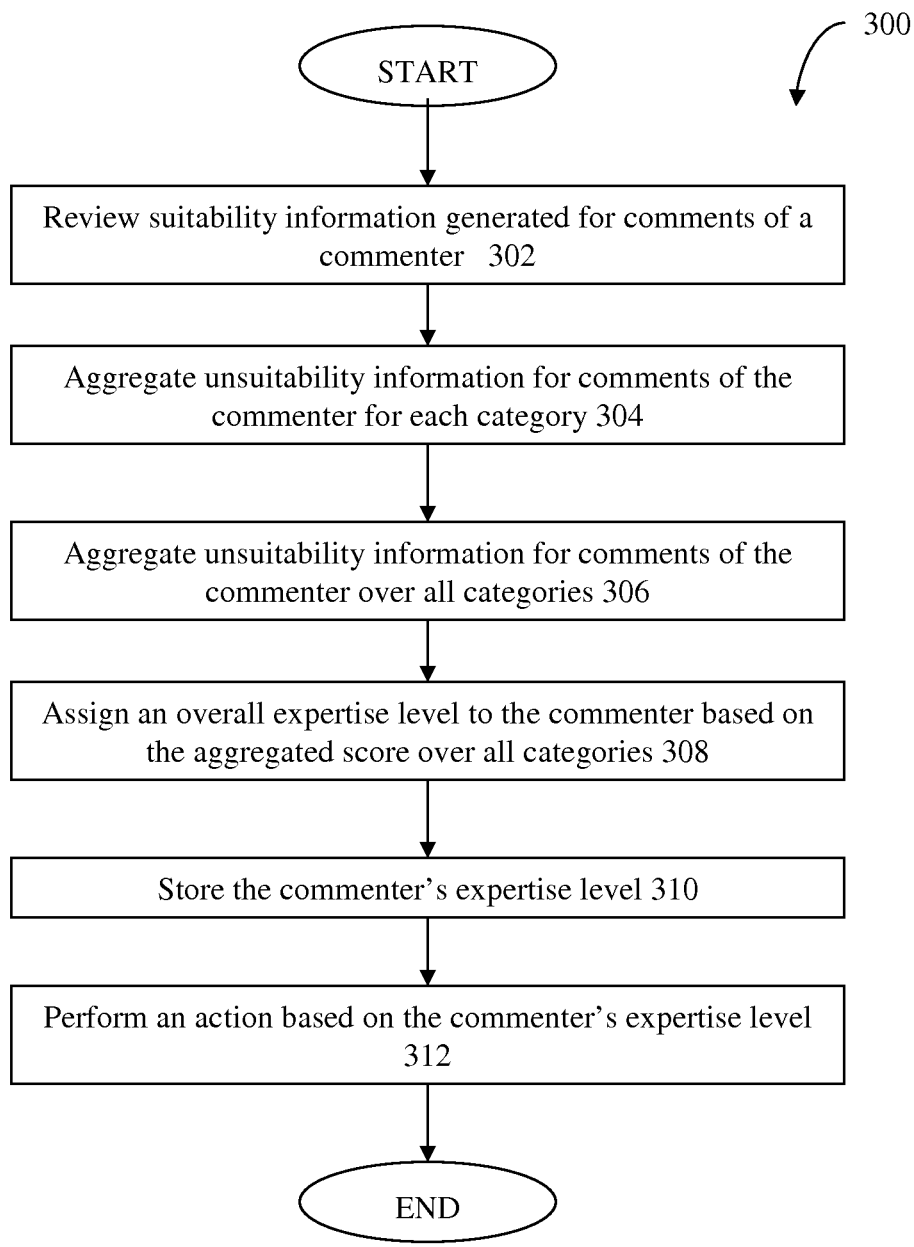
FIG. 3 is a flowchart showing an exemplary computer-implemented and computer-executable method according to exemplary embodiments for assigning an expertise level to a user.
Figure 4:
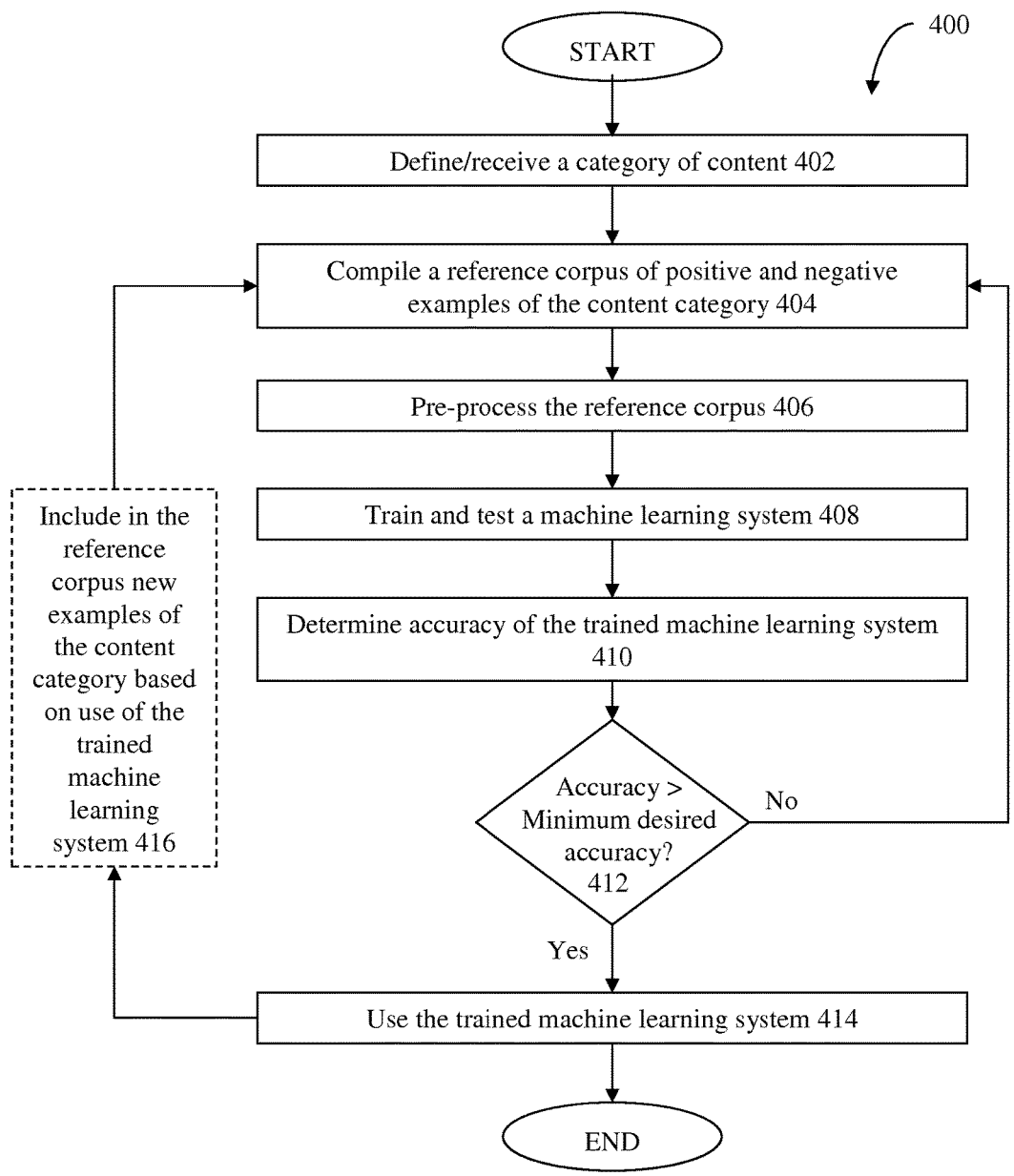
FIG. 4 is a flowchart showing an exemplary computer-implemented and computer-executable method according to exemplary embodiments for training, testing and using a machine learning system implementing a machine learning algorithm embodied on one or more computer-readable media.

FIG. 3 is a flowchart showing an exemplary computer-implemented and computer-executable method 300 according to exemplary embodiments for assigning an expertise level to a user. The exemplary method 300 may be performed periodically or upon receipt of a user-generated or a computer-generated command (for example, in real time).

In step 302, exemplary embodiments may review the suitability or unsuitability information generated for some or all of the comments of the user. The information may be reviewed in the exemplary database structure 200 shown in FIG. 2.

In step 304, for each unsuitable category (for example, exemplary categories "abusive," "racist" and "sexist" illustrated in FIG. 2), exemplary embodiments may aggregate the unsuitability information for the comments of the user to generate an indication of how suitable or unsuitable the user's comments are in each category.

Exemplary embodiments may aggregate the probability values assigned to the comments in relation to each category by generating an average probability value. The average probability value for the unsuitable category may function as the aggregation of the unsuitability information for the category in an exemplary embodiment. For example, in FIG. 2, columns 210, 212 and 214 may indicate average probability values for each user's comments in the categories of "abusive," "racist" and "sexist," respectively. Column 210 for the "abusive" category, for example, may indicate that user 9834 has an average probability value of 0.1 for the "abusive" category over all of his/her comments, user 532 has an average probability value of 0.9 for the "abusive" category over all of his/her comments, and user 6547 has an average probability value of 0.5 for the "abusive" category over all of his/her comments.

In an exemplary embodiment, exemplary embodiments may assign a category-specific score based on the average probability value for each category (for example, higher scores for lower probability values). This category-specific score may function as the aggregation of the unsuitability information for the category in an exemplary embodiment.

In an exemplary embodiment, exemplary embodiments may assign an expertise level to the user corresponding to each category (for example, whether the user is a "problem" user or an "expert" user) based on the average probability value corresponding to the category or the category-specific score. A high expertise level, for example, "Expert" user, may be assigned if the average probability value is lower than (or lower than or equal to) a predefined threshold value, for example, 0.2, 0.25, 0.3, and the like. A low expertise level, for example, "Problem" user, may be assigned if the average probability value is higher than (or higher than or equal to) a predefined threshold value, for example, 0.8, 0.85, 0.9, and the like. For example, in FIG. 2, columns 210, 212 and 214 may indicate an expertise status for each user in the categories "abusive," "racist" and "sexist," respectively. Column 210 for the "abusive" category, for example, may indicate that user 9834 has an expertise status of "Expert" user based on the low average probability value of 0.1, user 532 has an expertise status of "Problem" user based on the high average probability value of 0.9, and user 6547 has no expertise status based on the moderate average probability value of 0.5.

In step 306, exemplary embodiments may aggregate the unsuitability information for the comments of the user over all unsuitable categories to generate an indication of the suitability or unsuitability of all of the user's comments. In an exemplary embodiment, exemplary embodiments may aggregate the probability values assigned to the comments over all categories by generating an average probability value. In an exemplary embodiment, exemplary embodiments may assign the user an overall score based on the average probability value over all categories (for example, higher scores for lower probability values).

In step 308, exemplary embodiments may assign an expertise level to each user or update an expertise level previously assigned to each user based on the aggregated unsuitability information for the user's comments. In exemplary embodiments, the expertise level may be assigned based on the unsuitability score aggregated over all categories, or based on unsuitability scores aggregated over each of the different categories. A high expertise level, for example, an "Expert" user status, may be assigned if the average probability value is lower than (or lower than or equal to) a predefined threshold value, for example, 0.2, 0.25, 0.3, and the like. A low expertise level, for example, a "Problem" user status, may be assigned if the average probability value is higher than (or higher than or equal to) a predefined threshold value, e.g., 0.8, 0.85, 0.9, and the like. For example, in FIG. 2, column 216 may indicate the expertise level for each user. Column 216, for example, may indicate that user 9834 is an "Expert" user, user 532 is a "Problem" user, and user 6547 is not assigned an expertise level.

In step 310, exemplary embodiments may store the user's expertise level and other information related to the user's comments.

In step 312, exemplary embodiments may perform one or more actions based on the user's expertise level, in an exemplary embodiment, comments of the user published on the web page may be accompanied by a visual indication, for example, a badge, that indicates the user's expertise level. In an exemplary embodiment, comments of the user that are pending review by a trained machine learning system implementing a machine learning algorithm embodied on one or more computer-readable media for suitability for publication may be prioritized or de-prioritized based on the user's expertise level. For example, an "Expert" user's comments may be prioritized over the comments of a "Problem" user.

Optionally, in step 312, exemplary embodiments may perform one or more actions to discipline a user assigned a low expertise level, for example, a "Problem" level. Exemplary disciplinary actions may include, but are not limited to, warning, flagging or banning the user from the website.

Figure is a flowchart showing a computer-implemented and computer-executable method 400 according to exemplary embodiments for training, testing and using an exemplary machine learning system implementing a machine learning algorithm embodied on one or more computer-readable media.

In step 402, exemplary embodiments may define or receive one or more categories to be used in analyzing user-generated content. In exemplary embodiments, a category may be binary, i.e., content may be either a positive example of the category or a negative example of the category. For example, for the binary category "abusive," any particular piece of text may be categorized only as a positive example of the category (i.e., abusive) or as a negative example of the category (i.e., non-abusive). Examples of binary categories include, but are not limited to, abusive, sexist, racist, homophobic, and the like.

In step 404, a reference corpus may be compiled for each category to contain verified positive and negative content examples of the category. The verification may be performed by a human reviewer.

Figure 5:
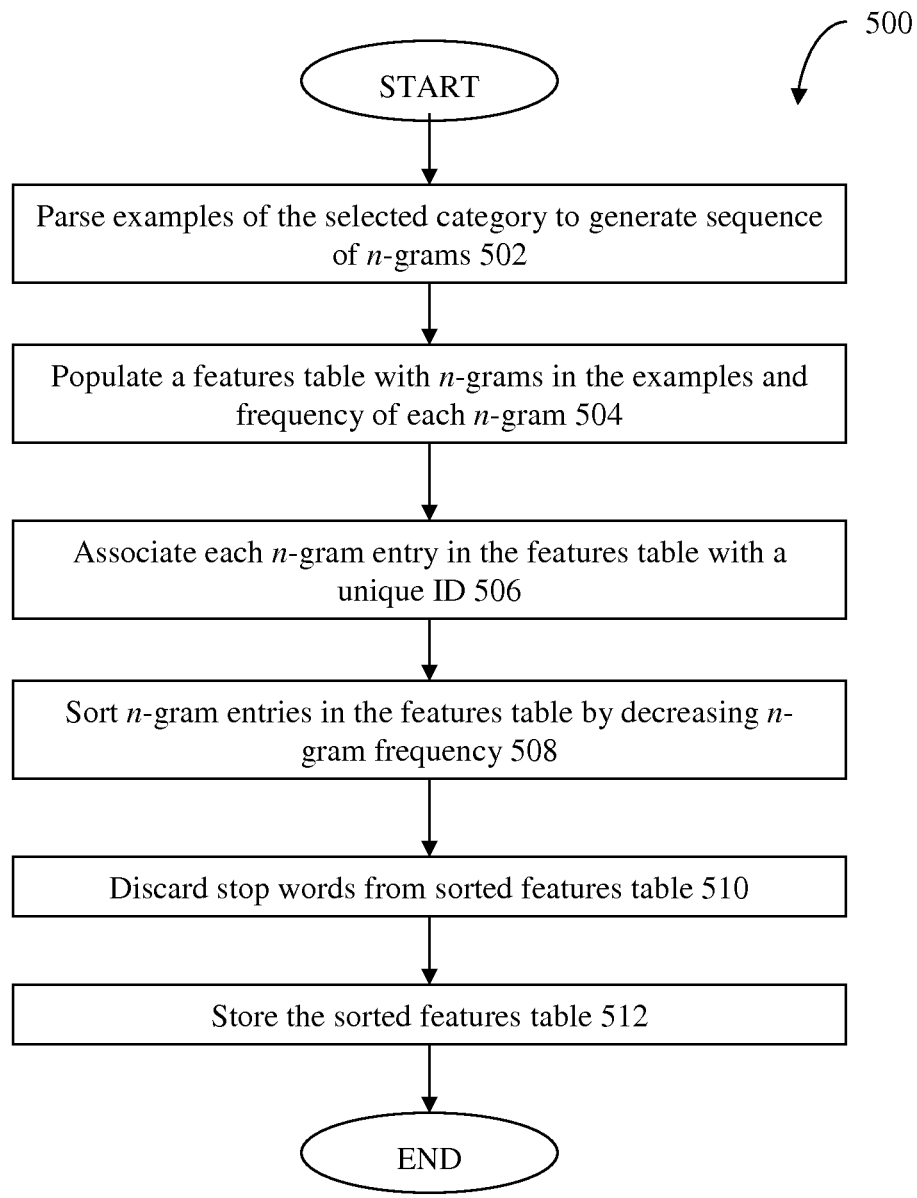
FIG. 5 is a flowchart showing an exemplary computer-implemented and computer-executable method according to exemplary embodiments for pre-processing examples in a reference corpus.

In step 406, the reference corpora for all of the categories may be pre-processed to facilitate the creation of training and test vectors for training and testing an exemplary machine learning system implementing a machine learning algorithm embodied on one or more computer-readable media. An exemplary method 500 for pre-processing the reference corpora is illustrated in FIG. 5 and described in more detail below in connection with FIG. 5.

Figure 7:
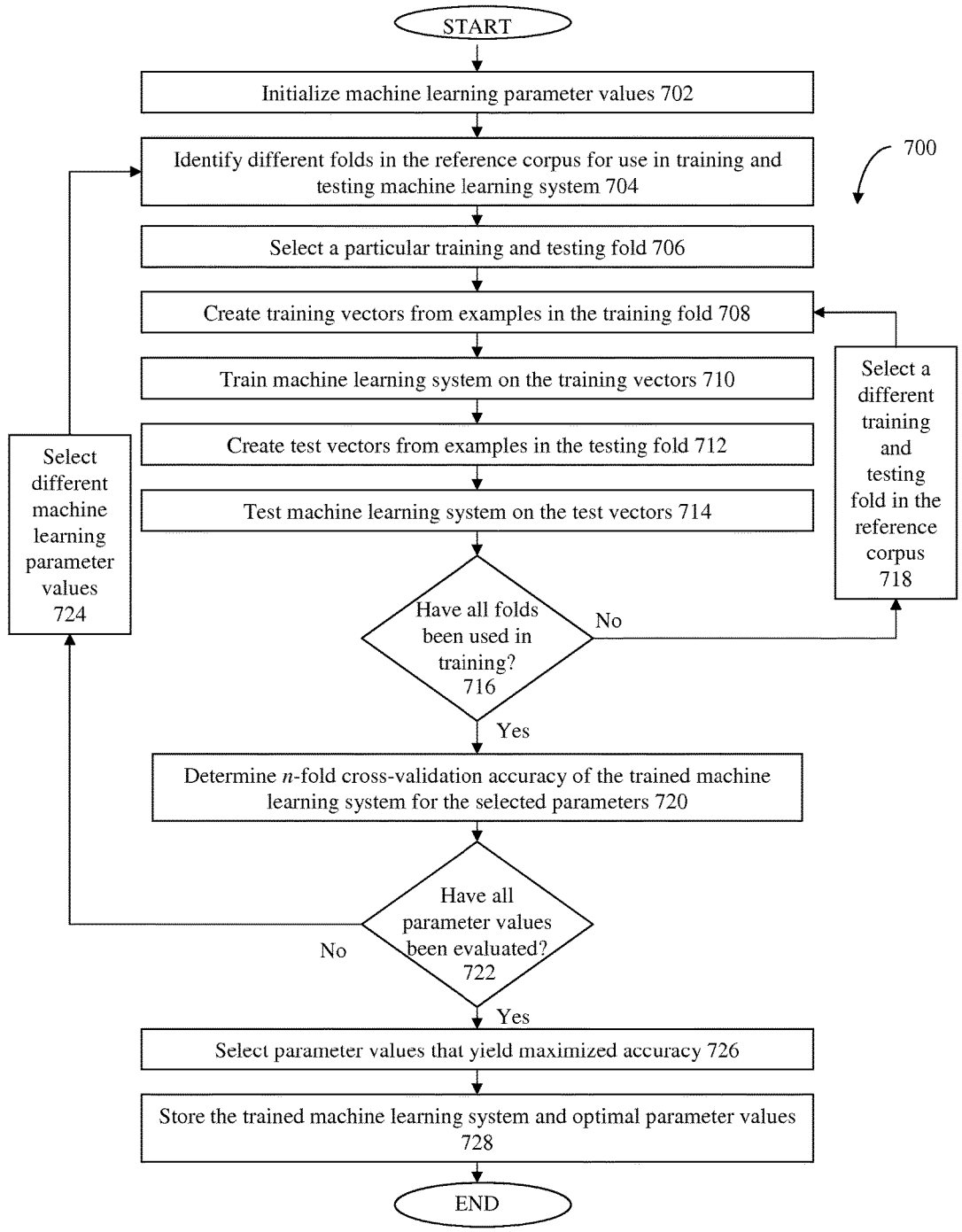
FIG. 7 is a flowchart showing an exemplary computer-implemented and computer-executable method according to exemplary embodiments for training and testing a machine learning system implementing a machine learning algorithm embodied on one or more computer-readable media to automatically assess the likelihood of a particular piece of user-generated text falling into a selected category.

In step 408, an exemplary machine learning system implementing a machine learning algorithm embodied on one or more computer-readable media may be trained and tested using examples in the pre-processed reference corpora so that the trained machine learning system may automatically assess whether a particular user-generated content falls into one or more categories associated with the reference corpora. An exemplary method 700 for training and testing an exemplary machine learning system is illustrated in FIG. 7 and described in more detail in connection with FIG. 7.

In step 410, upon testing of the trained machine learning system, exemplary embodiments may determine the accuracy with which the trained machine learning system determines whether particular content falls into the categories.

In step 412, exemplary embodiments may determine if the accuracy value achieved by the machine learning system is above a predefined threshold accuracy value. The threshold accuracy value may be an accuracy value at or above which the machine learning system is considered sufficiently accurate. Exemplary threshold accuracy values in exemplary embodiments may range from about 80% to about 100%. If the trained machine learning system has achieved a sufficient accuracy, then the machine learning system is considered sufficiently trained and the "Yes" branch may be taken.

Figure 15:
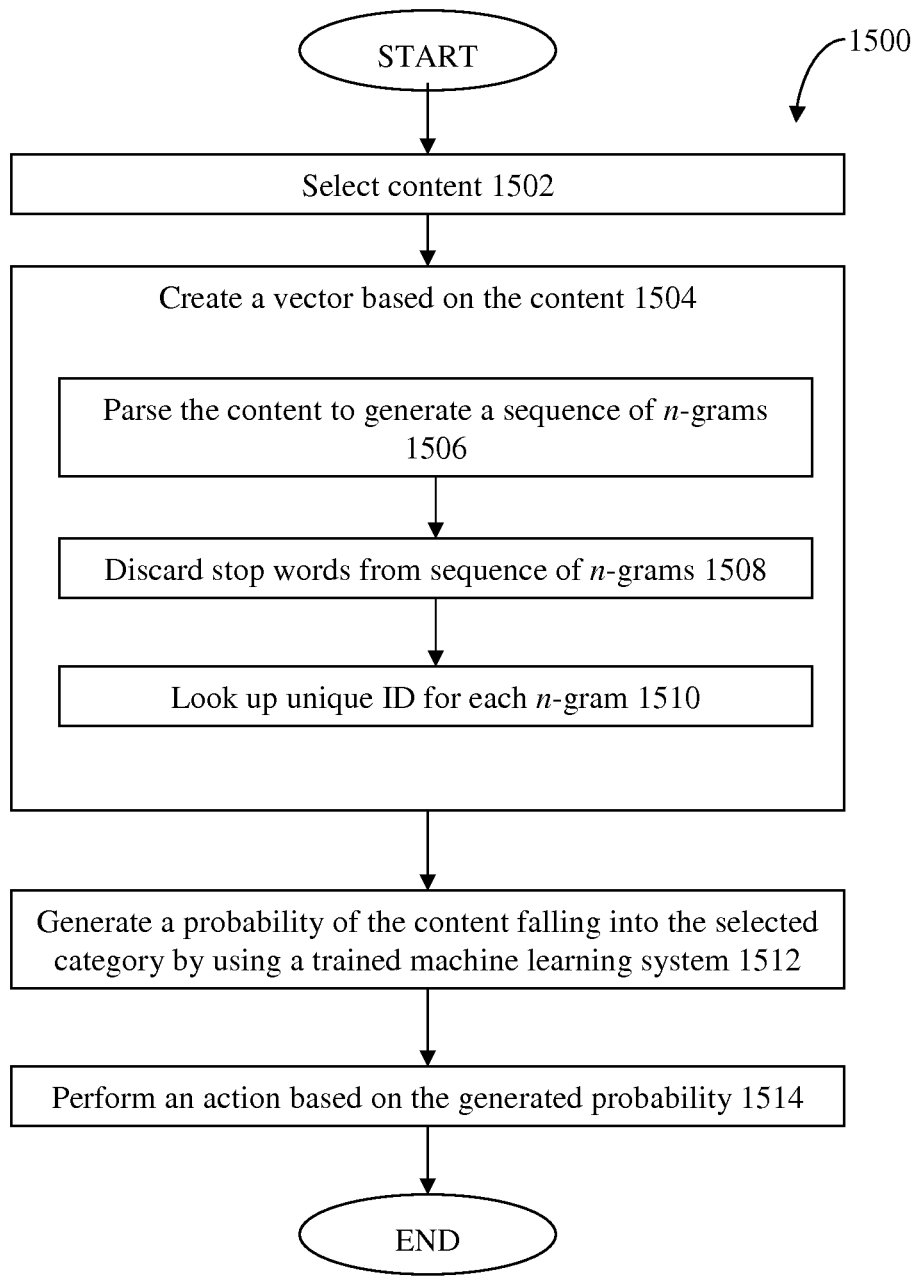
FIG. 15 is a flowchart showing an exemplary computer-implemented and computer-executable method according to exemplary embodiments that may be used to categorize web page content in a production environment.

In step 414, the trained and tested machine learning system may be used on new user-generated content, for example, in a real-time environment for a blog. An exemplary method 1500 for using an exemplary trained machine learning system is illustrated in FIG. 15 and described in more detail in connection with FIG. 15.

During its use, the machine learning system may encounter content that are not present in the reference corpora. Optionally, in step 416, the new examples may be included in the reference corpora and used in retraining of the machine learning system. In exemplary embodiments, the machine learning system may be retrained at any suitable time to improve its accuracy.

Returning to step 412, if the machine learning system has not achieved a sufficient accuracy, then the "No" branch is taken and further training is performed on the machine learning system (i.e., control returns to step 404). In an exemplary embodiment, before further training is performed, the reference corpora may be enriched with more examples in step 404 to improve the accuracy of the trained system. In another exemplary embodiment, the reference corpora may not be further enriched before further training takes place.

Exemplary Pre-Processing of Examples in Reference Corpus

FIG. 5 illustrates an exemplary computer-implemented and computer-executable method 500 for pre-processing examples in a reference corpus before generation of training or testing vectors based on the examples.

In step 502, the text of each positive and negative example in the reference corpus is parsed to generate a sequence of n-grams and the frequency with which each n-gram appears in each example.

In step 504, a features table is generated or updated to populate the features table with the n-grams and associated n-gram frequencies for the examples in the reference corpus. If the same n-gram appears in two or more examples, the same n-gram is not entered multiple times in the features table, but rather the frequency of the same n-gram entry is updated based on its recurrence.

In step 506, each unique n-gram entry in the features table is provided with a unique identifier (ID). The unique ID may be generated automatically or by a user. The unique ID may be generated randomly or may be associated indirectly to the n-gram.

In step 508, the n-gram entries in the features table are sorted by decreasing n-gram frequency.

In step 510, in an exemplary embodiment, one or more stop words may discarded from the sorted features table. Stop words are commonly used terms and tend to appear at the top of the sorted features table due to their relatively high frequencies. In the exemplary embodiment illustrated in FIG. 5, stop words may be discarded after the n-grams are generated. In another exemplary embodiment, stop words may be discarded before the n-grams are generated. In another exemplary embodiment, stop words may be retained in the pre-processing of the examples in the reference table.

In an exemplary embodiment, certain non-word textual features that are predictive of categories may be retained. Examples of these textual features include, but are not limited to, capitalization, question marks, exclamation points, and the like.

In step 512, the sorted features table is stored on a storage device. The sorted features table is used in generating training vectors for training an exemplary machine learning system and in generating test vectors for testing a machine learning system.

Figure 6A:
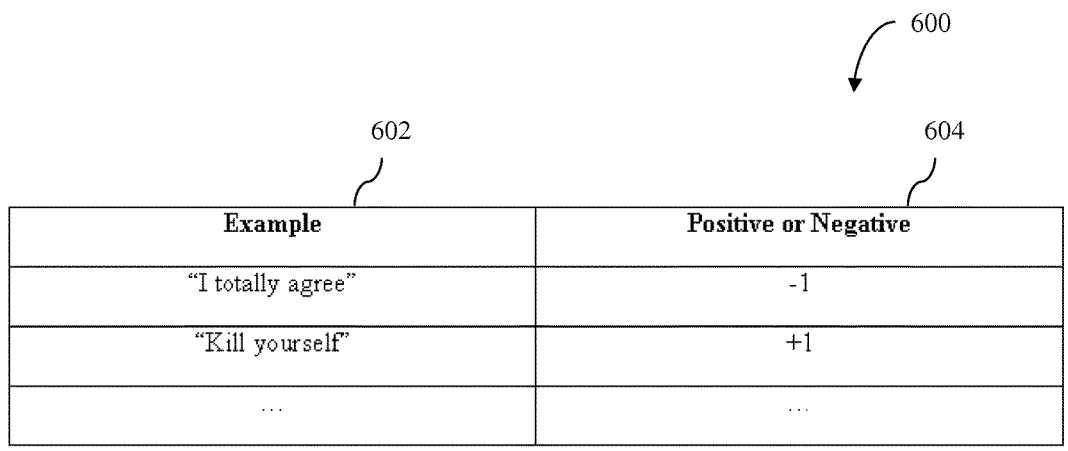
FIG. 6A is a diagram showing an exemplary reference corpus.

FIG. 6A is a diagram showing an exemplary reference corpus 600 for the category "abusive."

The reference corpus 600 includes a collection of positive and negative examples 602 of the category "abusive" and, for each example, an indication 604 of whether the example is a positive example or a negative example of the category "abusive," Each example in column 602 may be parsed into a sequence of constituent n-grams. In this example, unigrams and bigrams are used. In other exemplary embodiments, trigrams and/or other n-grams may also be used. Each n-gram in each example is determined to have a frequency of one in the illustrative example. The n-gram features and their associated frequencies are entered into a features table 650 which may be stored in a database. The exemplary reference corpus 600 of FIG. 6A is merely illustrative, and any suitable storage structure may be used to store the examples of a category.

Figure 6B:
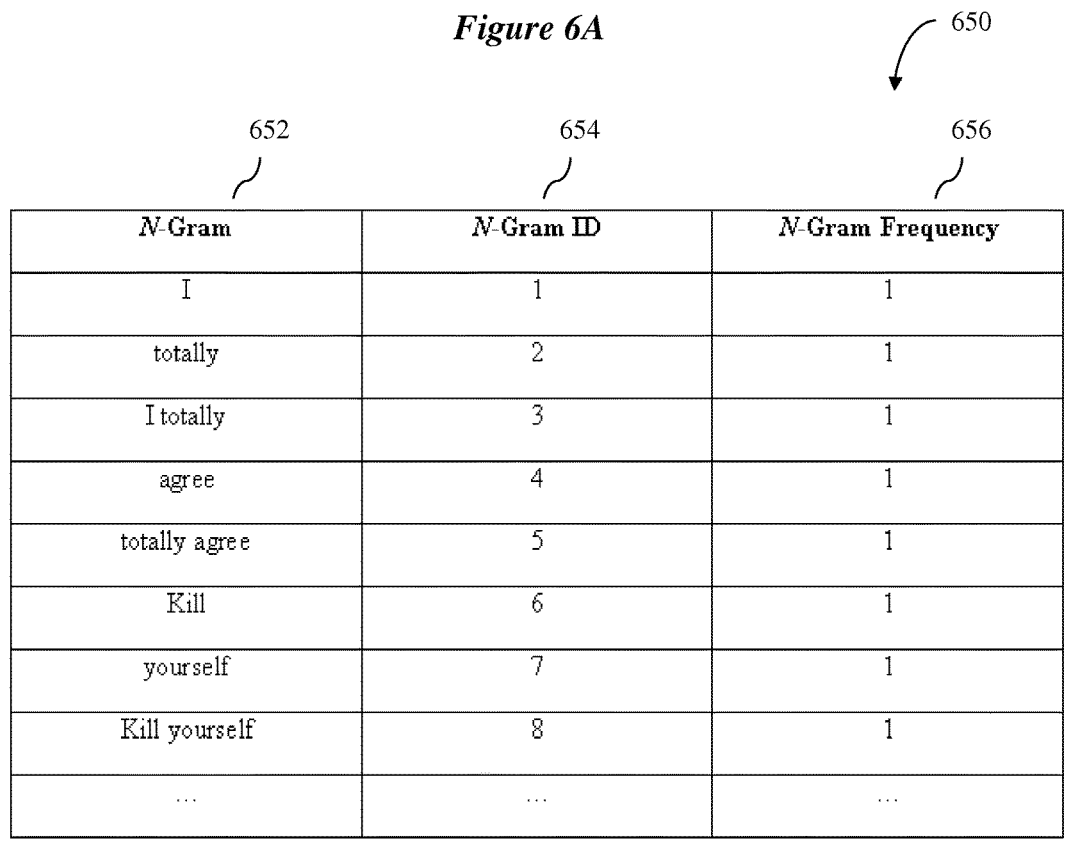
FIG. 6B is a diagram showing an exemplary features table produced by pre-processing the exemplary reference corpus of FIG. 6A.

FIG. 6B is a diagram showing an exemplary features table 650 corresponding to the reference corpus 600.

An exemplary features table 650 may have a column 654 for unique IDs associated with n-gram entries, a column 652 for unique n-grams, and a column 656 for n-gram frequencies. Each n-gram is given a unique ID that is stored in the column 652 of the features table 650. The n-gram entries in the features table 650 are then sorted by decreasing n-gram frequency in the column 656 of the features table 650. Entries with stop words as n-grams are discarded from the features table 650 after generation of the n-grams in an exemplary embodiment. The exemplary features table 650 of FIG. 6B is merely illustrative, and any suitable storage structure may be used to store the n-grams, their associated frequencies and their corresponding unique IDs.

Exemplary Training and Testing of Exemplary Machine Learning Systems

After pre-processing of the examples in the reference corpus for a selected category, an exemplary machine learning system implementing a machine learning algorithm embodied on one or more computer-readable media may be trained and tested using examples in the reference corpus so that the trained system is able to automatically assess the likelihood of a particular piece of user-generated content falling into the selected category (for example, abusive, sexist, racist, and the like). The exemplary machine learning system may employ a weak learner that follows a set of rules to classify any given piece of text into a positive or a negative example of the selected category. The exemplary machine learning system may also employ a boosting algorithm for improving the accuracy of the weak learner.

Exemplary machine learning systems may employ any suitable weak learner that can classify a piece of text into a positive or a negative example of the selected category. The weak learner may implement any suitable technique including, but not limited to, decision trees, neural networks, hidden Markov models, nearest neighbor classifiers, simple rules of thumb, and the like.

In an exemplary embodiment, the weak learner may classify a piece of text based on the existence of one or more pre-defined features in the text, for example, the feature "shut up." The pre-defined features may be associated with positive or negative examples of a selected category. For example, "shut up" may be associated with the category "abusive." The existence of the features in the piece of text may be used by the weak learner to classify the piece of text as a positive example or a negative example of the selected category.

Exemplary machine learning systems may employ any suitable boosting algorithm including, but not limited to, AdaBoost, icsiboost, textbooster, linsvm, and the like. An exemplary boosting algorithm that may be used in accordance with exemplary embodiments calls the weak learner repeatedly on a set of training examples in a series of rounds. Before each round, a distribution of weights over the training examples is updated to indicate the importance of certain examples. For example, the weights of incorrectly classified examples are increased and the weights of correctly classified examples are decreased. The adjustment of the weight distribution allows the weak learner to focus on the incorrectly classified examples in subsequent rounds.

FIG. 7 is a flowchart showing an exemplary computer-implemented and computer-executable method 700 according to exemplary embodiments for training and testing an exemplary machine learning system to automatically assess the likelihood of a particular piece of user-generated text falling into a selected category.

One or more parameters may be used in training and testing the machine learning system. Exemplary parameters include, but are not limited to, the weak learner used to classify text as positive or negative examples of the selected category, the number of rounds used in the boosting system, and the like. In step 702, a set of one or more parameter values used in training and testing the exemplary machine learning system are initialized. The initial parameter values may be predefined.

In step 704, different folds are identified in the reference corpus for use in training and testing the machine learning system. Training and testing is performed on each of the different folds.

In step 706, a particular training and testing fold is selected in the reference corpus from the identified folds, for example, either the fold identified in FIG. 8B or the fold identified in FIG. 8C (discussed below). Training examples present in the selected fold are used to train the machine learning system, and test examples present in the selected fold are used to test the machine learning system.

In an exemplary embodiment, the machine learning system accepts as training input a set of training vectors generated from the training examples. In step 708, training vectors are generated based on the training examples present in the selected fold.

In step 710, the machine learning system is trained on the training vectors.

In an exemplary embodiment, the machine learning system accepts as test input a set of test vectors generated from the test examples. In step 712, test vectors are created based on test examples present in the selected fold.

In step 714, the trained machine learning system is tested on the test vectors.

In step 716, in an exemplary embodiment, it is determined whether all of the folds have been used in training and testing the machine learning system. If all of the folds have not been used, the "No" branch is taken and a different training and testing fold is selected in the reference corpus in step 718. Subsequently, the method returns to step 708.

Returning to step 716, if all of the folds have been used, the "Yes" branch is taken and, in step 720, exemplary embodiments determine the n-fold cross-validation accuracy with which the trained machine learning system categorizes test examples as positive and negative examples of the selected category. For example, if the machine learning system correctly categorizes all of the test examples that are abusive as being positive examples of the category "abusive," then the accuracy is determined to be 100%. Similarly, if the machine learning system incorrectly categorizes all of the test examples that are abusive as being negative examples of the category "abusive," then the accuracy is determined to be 0%.

In step 722, it is determined whether all desired parameter values have been used in training and testing the machine learning system. If all desired parameter values have not been used, the "No" branch is taken and, in step 724, a set of one or more different parameter values is selected and the method returns to step 704.

Returning to step 722, if all desired parameter values have been used, the "Yes" branch is taken and the method proceeds to step 726.

In an exemplary embodiment, for each parameter, method 700 trains and tests the machine learning system over a plurality of parameter values. For each parameter value used, method 700 determines the accuracy of the machine learning system. In step 726, exemplary embodiments assess the change in the accuracy over different values for each parameter. For example, exemplary embodiments may generate a graph of the accuracy (y-axis) against different parameter values (x-axis) for each parameter. Based on the assessment, exemplary embodiments may select a parameter value for each parameter at which one or more performance characteristics of the machine learning system are maximized. The performance characteristics may include, but are not limited to, the accuracy of the machine learning system, the speed of operation of the machine learning system, and the like.

Figure 9:
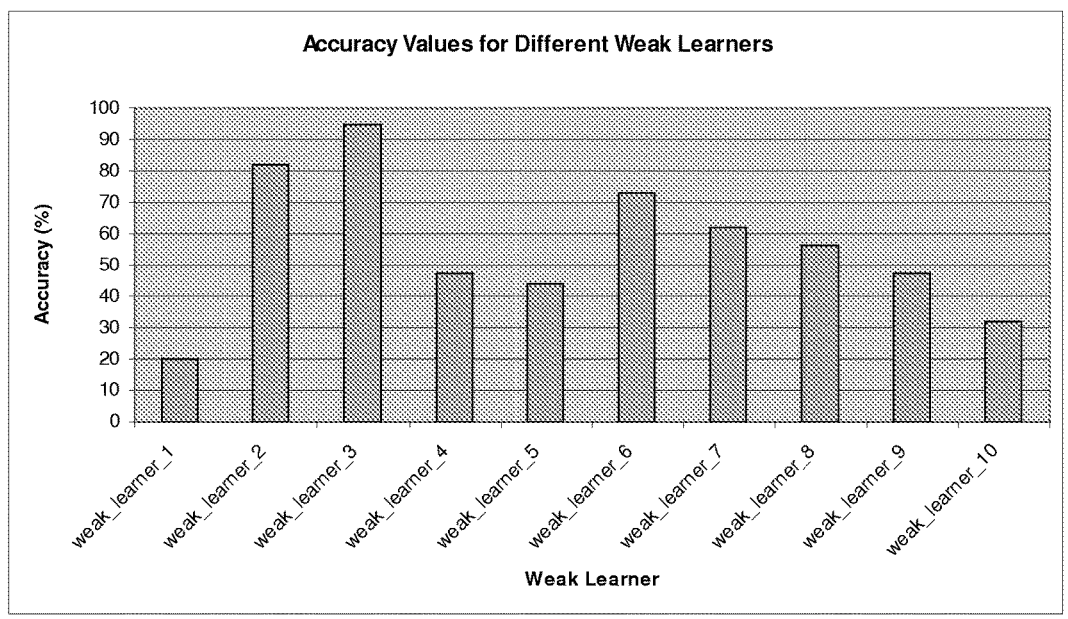
FIG. 9 is a diagram showing a histogram of exemplary accuracy values achieved by different trained weak learners.

In an exemplary embodiment, parameter values are selected to maximize the accuracy of the machine learning system. This results in the generation of a set of parameter values, each parameter value corresponding to a different parameter, at which the accuracy of the machine learning system is maximized. FIG. 9 illustrates a histogram of accuracy values (y-axis) achieved by different exemplary weak learners used (x-axis), of which "weak_learner_3" is selected in an exemplary embodiment in order to maximize accuracy.

In step 728, exemplary embodiments may store, on a storage device, the trained machine learning system and a set of parameter values at which the accuracy of the machine learning system is maximized.

Figure 8A:
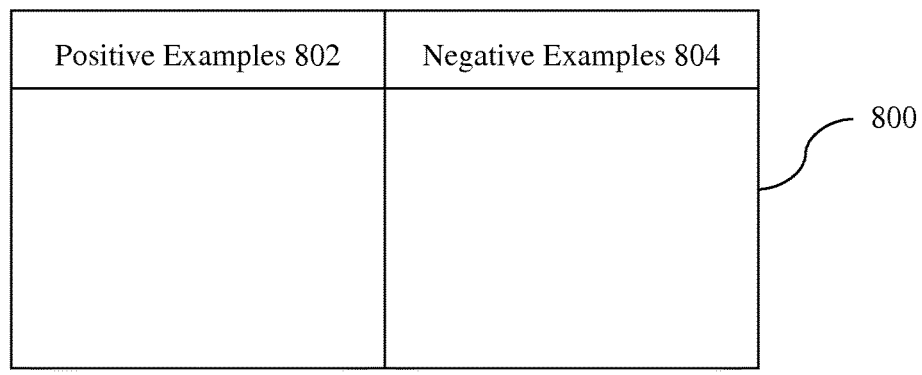
FIG. 8A is a diagram showing an exemplary reference corpus including positive and negative examples of a selected category.
Figure 8B:
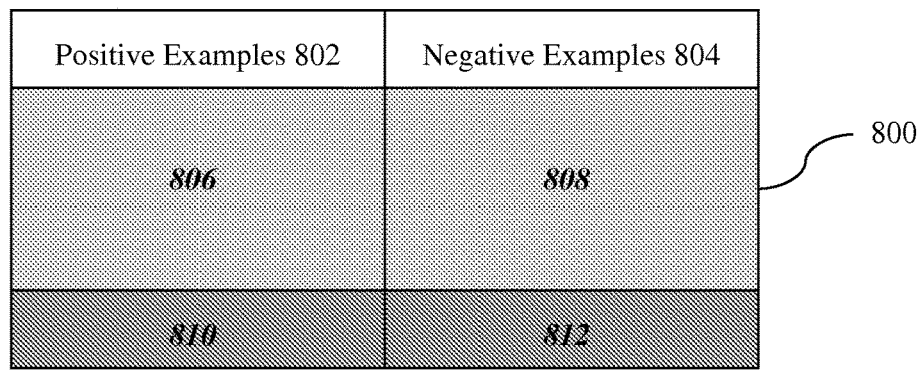
FIGS. 8B-8C are diagrams showing the exemplary reference corpus of FIG. 8A in greater detail, wherein positive and negative examples are selected for training a machine learning system implementing a machine learning algorithm embodied on one or more computer-readable media and other positive and negative examples are selected for testing the machine learning system implementing a machine learning algorithm embodied on one or more computer-readable media.
Figure 8C:
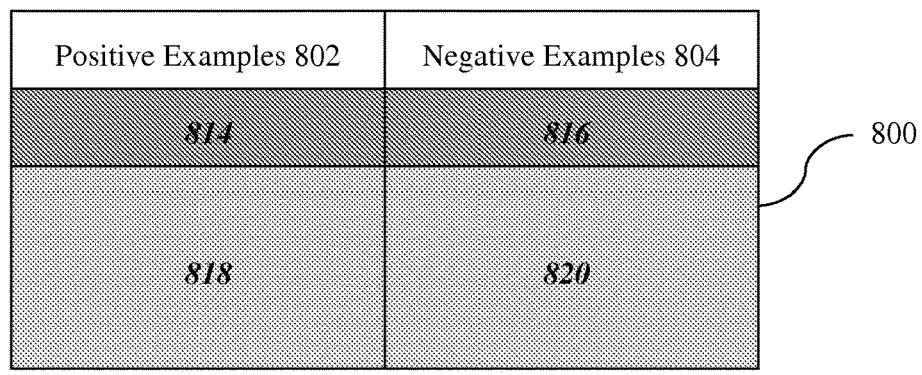

FIGS. 8A-8C illustrate the identification of different folds in an exemplary reference corpus 800. FIG. 8A is a diagram showing an exemplary reference corpus 800 of a selected category. The reference corpus 800 includes a set of one or more positive examples 802 of the category and a set of one or more negative examples 804 of the category.

FIG. 8B is a diagram showing a fold of the exemplary reference corpus of FIG. 8A in which certain positive 806 and negative 808 examples are selected for training an exemplary machine learning system and certain other positive 810 and negative 812 examples are selected for testing the machine learning system.

FIG. 8C is a diagram showing a different fold of the exemplary reference corpus of FIG. 8A in which certain positive 814 and negative 816 examples are selected for training an exemplary machine learning system and certain other positive 818 and negative 820 examples are selected for testing the machine learning system. The training and test examples selected in FIG. 8C are different from those selected in FIG. 8B. One of ordinary skill in the art will recognize that the exemplary folds of FIGS. 8B and 8C are presented merely for illustrative purposes and that any number of suitable folds may be used.

Exemplary Generation of Exemplary Training Vectors

Figure 10:
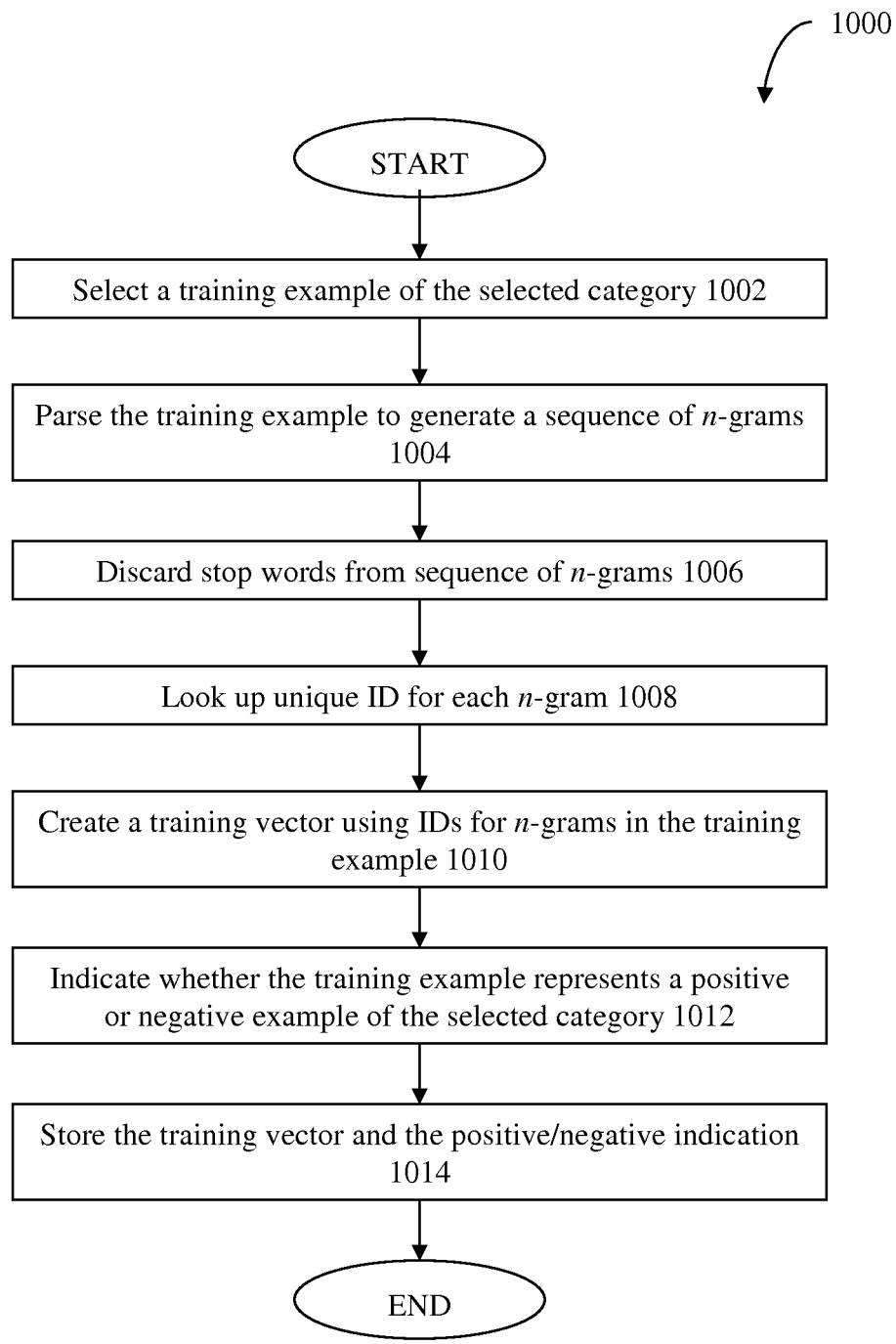
FIG. 10 is a flowchart showing an exemplary computer-implemented and computer-executable method according to exemplary embodiments for generating a training vector and for training a machine learning system implementing a machine learning algorithm embodied on one or more computer-readable media on a selected category.

FIG. 10 is a flowchart showing an exemplary computer-implemented and computer-executable method 1000 according to exemplary embodiments for generating a training vector for training a machine learning system on a selected category.

In step 1002, exemplary embodiments may select a training example of the selected category from a reference corpus. The example may be a positive example or a negative example of the selected category.

In step 1004, exemplary embodiments may parse the selected example to generate a sequence of one or more n-grams in the selected example. Exemplary n-grams include, but are not limited to, unigrams and bigrams, unigrams and bigrams and trigrams, and the like.

In step 1006, exemplary embodiments may remove one or more predefined stop words from the generated unigrams. In the exemplary embodiment illustrated in FIG. 10, stop words may be discarded after the n-grams are generated. In another exemplary embodiment, stop words may be discarded before the n-grams are generated. In another exemplary embodiment, stop words may be retained in the sequence of n-grams.

Certain non-word textual features that are predictive of whether the example falls into the selected category. Examples of these features include, but are not limited to, capitalization, question marks, exclamation points, and the like.

In step 1008, exemplary embodiments may look up in the features table the unique identifier for each n-gram generated based on the selected training example.

In step 1010, exemplary embodiments may create a training vector associated with the selected example based on the unique identifiers for the n-grams. In an exemplary embodiment, the training vector may be a combination, for example, a concatenation, of the unique identifiers for the n-grams.

In step 1012, exemplary embodiments may include a category indication for the selected example in the training vector, indicating whether the selected example is a positive or a negative example of the selected category. This category indication may be looked up in the reference corpus.

In step 1014, the training vector may be stored on a storage device. The training vector may be stored directly in the reference corpus or in a separate database.

Figure 11:
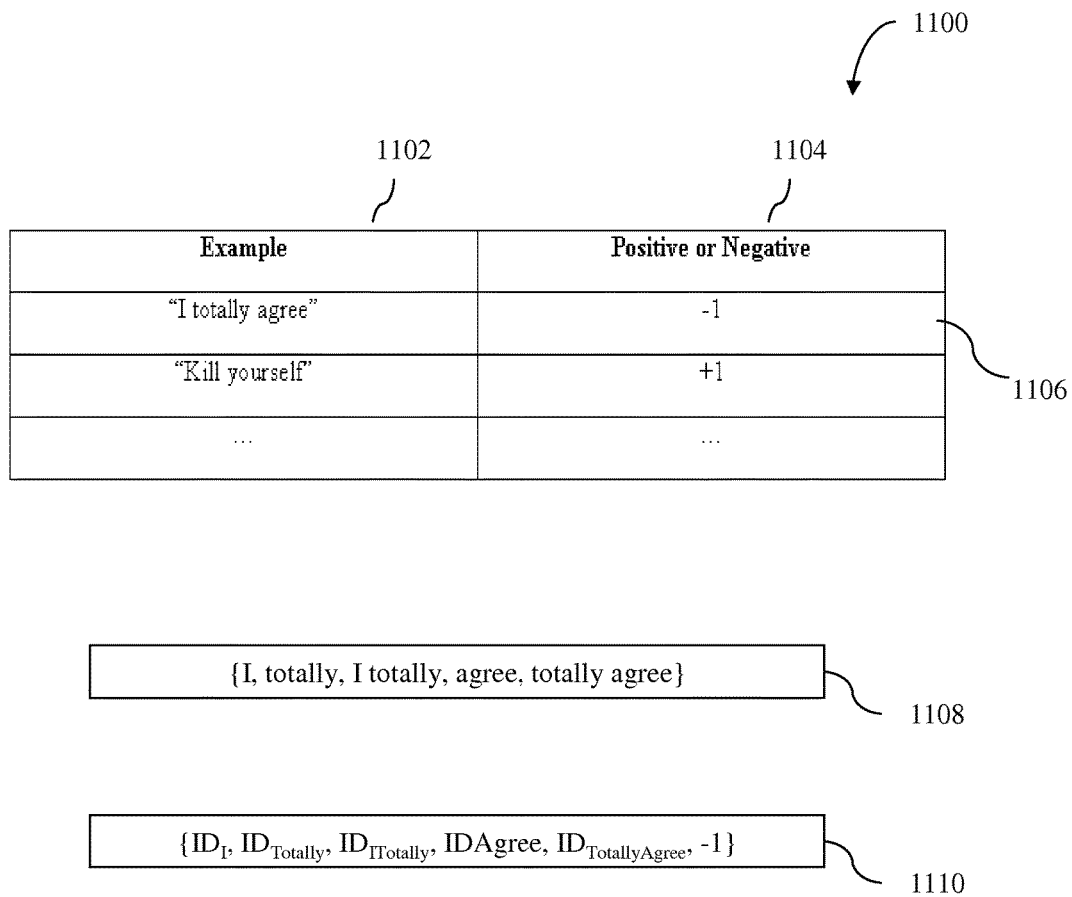
FIG. 11 is a diagram showing processing performed by the exemplary method of FIG. 10.

FIG. 11 is a diagram showing usage of the method 1000 of FIG. 10. In the exemplary use of FIG. 11, a negative example 1106 of the exemplary category "abusive" is selected from a reference corpus 1100 and used to generate a training vector that may be used to train an exemplary machine learning system.

The reference corpus 1100 is provided for the selected category and includes a collection of positive and negative examples 1102 of the category "abusive" and, for each example, an indication 1104 of whether the example is a positive example or a negative example.

An exemplary negative example 1106 (for example, a blog comment "I totally agree") of the category "abusive" is selected from the reference corpus 1100 to be used in training the machine learning system. Alternatively, a positive example may be selected. The example may be selected automatically or by a user.

The example 1106 is parsed into a sequence of n-grams 1108 ("I," "totally," "I totally," "agree," "totally agree"). In an exemplary embodiment, one or more stop words are removed from the generated unigrams. Each feature has an associated unique ID that is looked up in the features table ($ID_I$, $ID_{Totally}$, $ID_{ITotally}$, $ID_{Agree}$, $ID_{TotallyAgree}$), for example, the exemplary features table 650 illustrated in FIG. 6B, to generate a sequence of unique IDs 1110. The sequence of unique IDs 1110 may be used as a training vector in training an exemplary training example.

An indication of whether the training vector corresponds to a positive example or a negative example of the category "abusive" is provided to the machine learning system along with the training vector. This indication is looked up in the reference corpus 1100. In an exemplary embodiment illustrated in FIG. 11, the indication may be included directly in the training vector 1110, for example, as binary variable value (for example, +1 for a positive example or −1 for a negative example). In another exemplary embodiment, the indication may be provided to the machine learning system separately from the training vector.

Exemplary Generation of Exemplary Test Vectors

Figure 12:
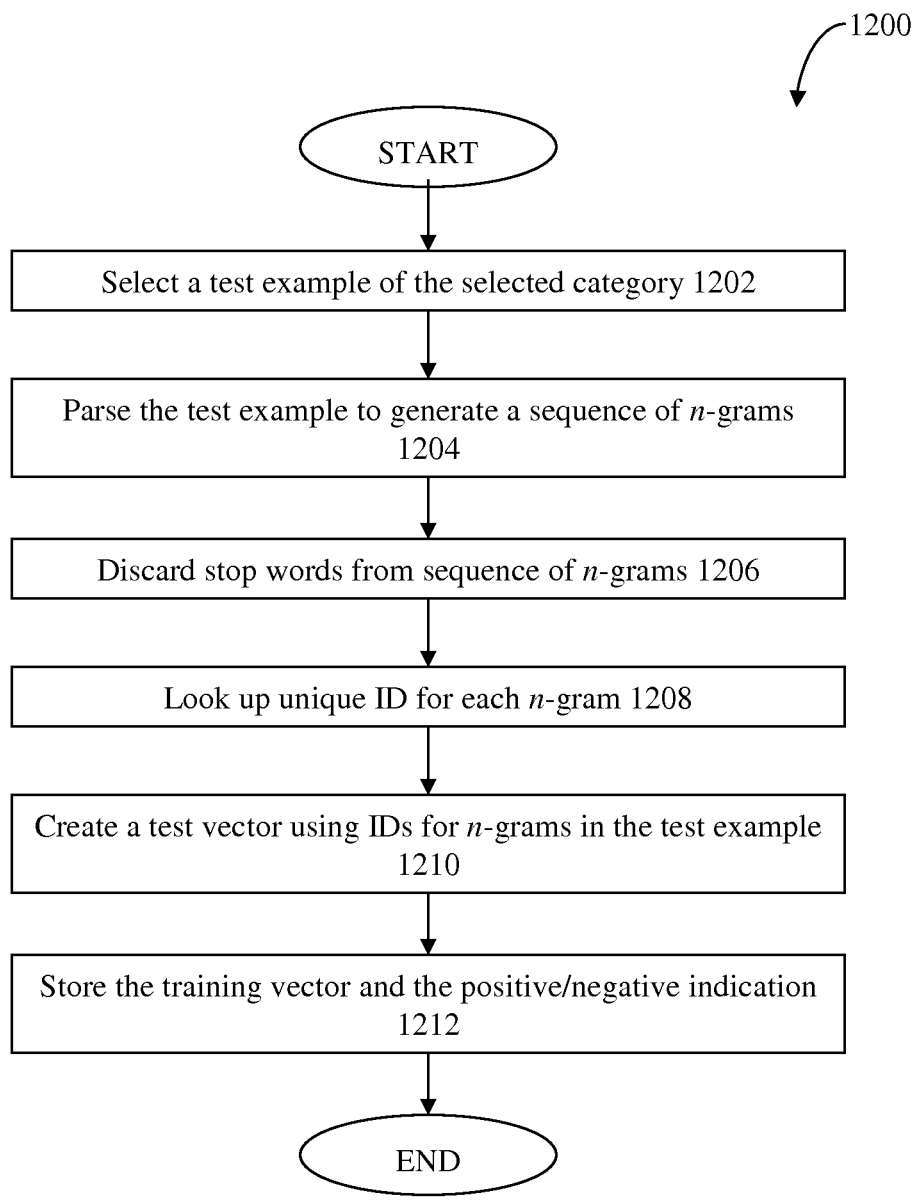
FIG. 12 is a flowchart showing an exemplary computer-implemented and computer-executable method according to exemplary embodiments for generating a test vector and for testing a trained machine learning system implementing a machine learning algorithm embodied on one or more computer-readable media on a selected category.

FIG. 12 is a flowchart showing an exemplary computer-implemented and computer-executable method 1200 according to exemplary embodiments for generating a test vector for testing a trained machine learning system on a selected category.

In step 1202, exemplary embodiments may select a test example of the selected category from a reference corpus. The example may be positive example or a negative example of the selected category.

In step 1204, exemplary embodiments may parse the selected example to generate a sequence one or more n-grams based on the selected example.

In step 1206, exemplary embodiments may remove one or more predefined stop words from the generated unigrams. In the exemplary embodiment illustrated in FIG. 12, stop words may be discarded after the n-grams are generated. In another exemplary embodiment, stop words may be discarded before the n-grams are generated. In another exemplary embodiment, stop words may be retained in the sequence of n-grams.

Certain non-word textual features that are predictive of unsuitable content may be retained. Examples of these textual features include, but are not limited to, capitalization, question marks, exclamation points, and the like.

In step 1208, exemplary embodiments may look up in the features table the unique identifier for each n-gram generated based on the selected test example.

In step 1210, exemplary embodiments may generate a test vector associated with the selected example based on the unique identifiers for the n-grams. In an exemplary embodiment, the test vector may be a combination, for example, a concatenation, of the unique identifiers for the n-grams.

In step 1212, the test vector may be stored on a storage device. The test vector may be stored directly in the reference corpus or in a separate database.

Figure 13:
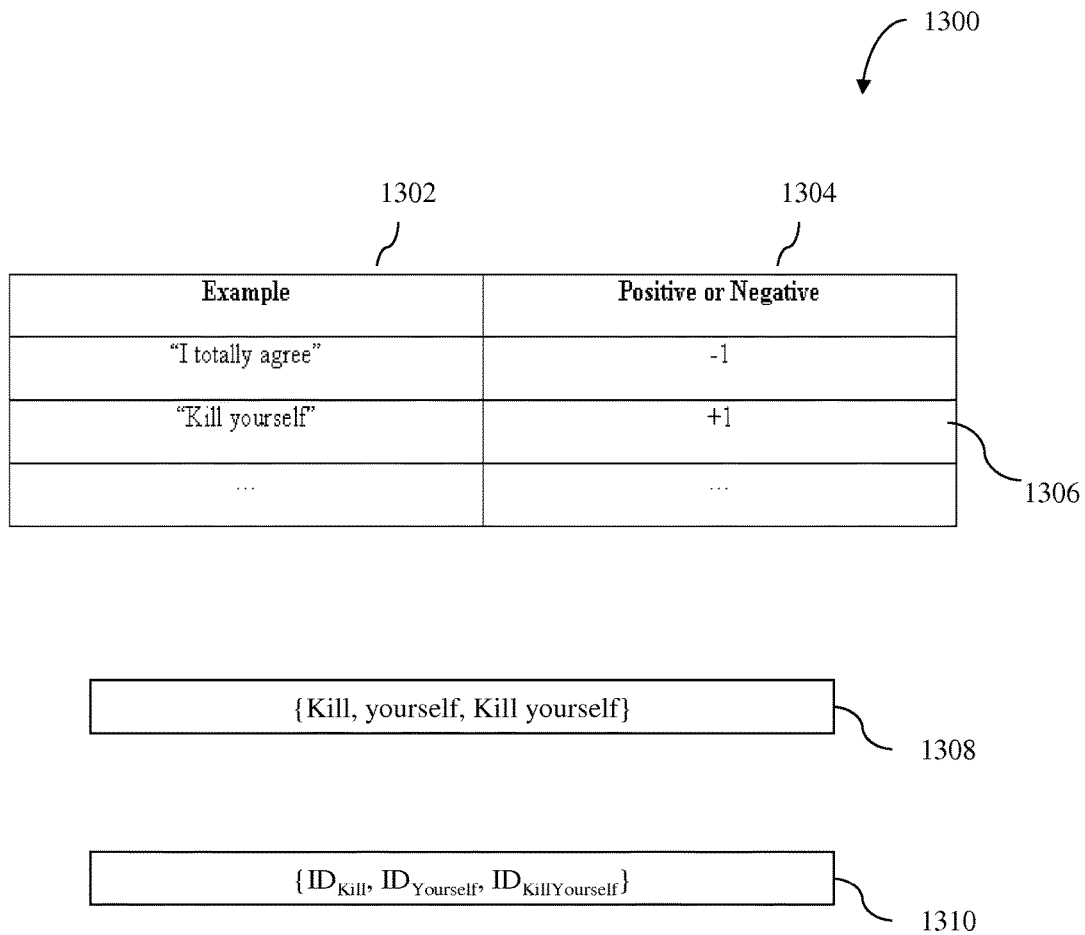
FIG. 13 is a diagram showing processing performed by the exemplary method of FIG. 12.

FIG. 13 is a diagram showing usage of the method 1000 of FIG. 10. In the exemplary usage shown in FIG. 13, a positive example 1306 of the exemplary category "abusive" is selected from a reference corpus 1300 and used to generate a test vector that may be used to test an exemplary trained machine learning system.

The reference corpus 1300 is provided for the selected category and includes a collection of positive and negative examples 1302 of the category "abusive" and, for each example, an indication 1304 of whether the example is a positive example or a negative example.

An exemplary positive example 1306 (for example, a blog comment "Kill yourself") of the category "abusive" is selected from the reference corpus 1300 to be used in testing the machine learning system. Alternatively, a positive example may be selected. The example may be selected automatically or by a user.

The example 1306 is parsed into a sequence of n-grams 1308 ("Kill," "yourself," "Kill yourself"). In an exemplary embodiment, one or more stop words are removed from the generated unigrams. Each feature has an associated unique ID that is looked up in the features table ($ID_{Kill}$, $ID_{Yourself}$, $ID_{KillYourself}$), for example, the exemplary features table 650 shown in FIG. 6B, to generate a sequence of unique IDs 1310. The sequence of unique IDs 1310 may be used as a training vector in training an exemplary training example.

Exemplary Computer-Implemented and Computer-Executable Implementation of Boosting Systems The exemplary machine learning system may employ a weak learner that follows a set of rules to classify any given piece of text into a positive or a negative example of a selected category. The exemplary machine learning system may also employ a boosting system employing a boosting algorithm for improving the accuracy of the weak learner. In an exemplary embodiment, the exemplary boosting algorithm may call a selected weak learner repeatedly on a set of training examples in a series of rounds. Before each round, the boosting algorithm may update a distribution of weights over the training examples to indicate the importance of certain training examples.

An exemplary boosting system that may be used in accordance with exemplary embodiments is described with reference to FIG. 14. One of ordinary skill in the art will recognize that this boosting system is illustrative and does not limit the scope of exemplary embodiments. One of ordinary skill in the art will recognize that any suitable weak learner and any suitable boosting system may be used in accordance with exemplary embodiments.

Figure 14:
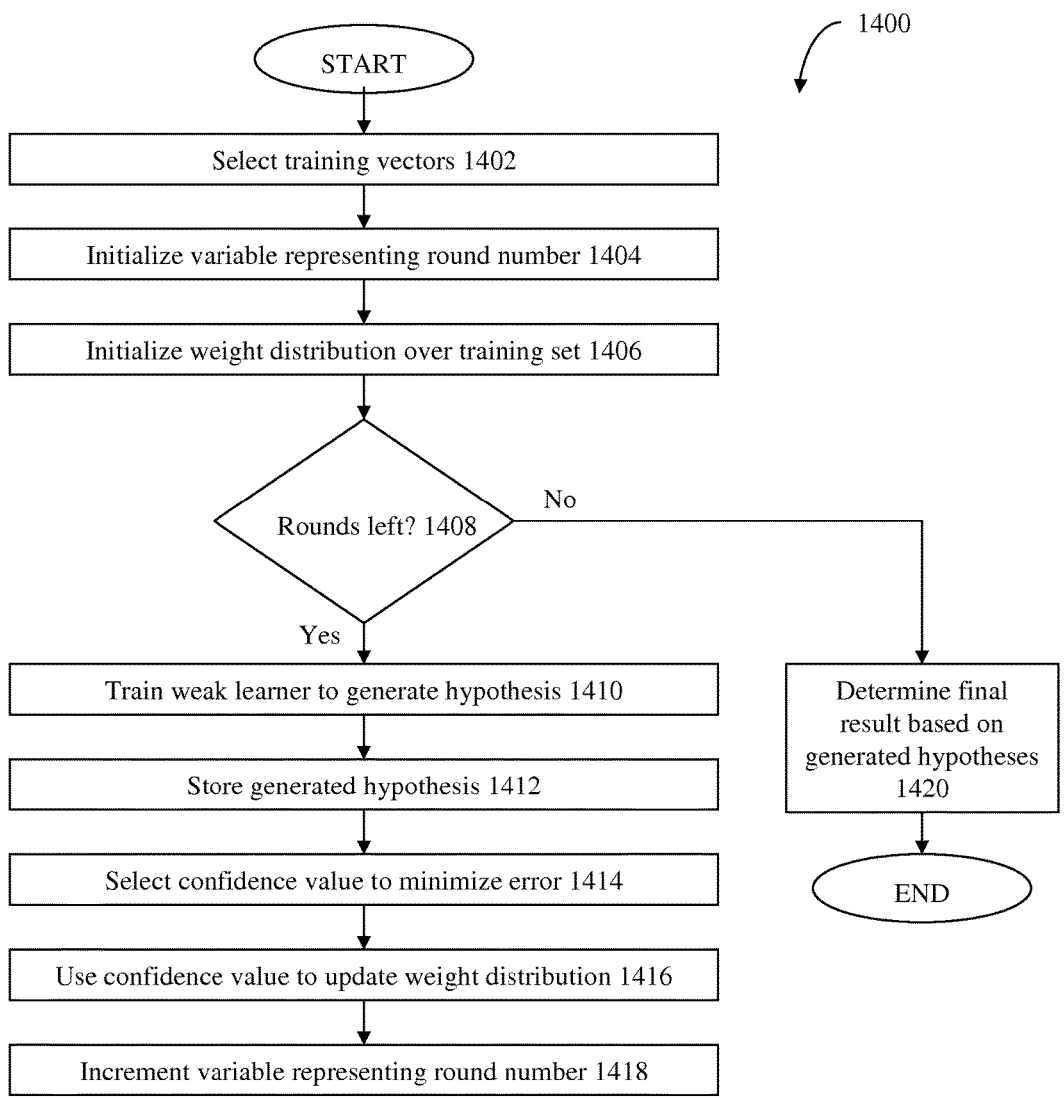
FIG. 14 is a flowchart showing an exemplary computer-implemented and computer executable method according to exemplary embodiments for implementing a boosting system implementing a boosting algorithm embodied on one or more computer-readable media.

FIG. 14 is a flowchart showing an exemplary computer-implemented and computer-executable method 1400 for implementing an exemplary boosting system. The method 1400 performs training over T rounds in an exemplary embodiment.

In step 1402, m training examples may be selected at random and training vectors associated with the m examples are used in the boosting algorithm. Each training example vector includes a collection of the unique n-gram IDs in the example (denoted as x) and an indication (denoted as y) of whether the example is a positive example (+1) or a negative example (−1).

Training set: $\{(x_1, y_1), \ldots, (x_m, y_m)\}$, where $x_i \in X$ $y_i \in y = \{-1, +1\}$ In step 1404, a variable (t) representing the number of the present round may be initialized to 1, i.e., t=1.

In step 1406, a weight distribution ($D_t$) over the training set is initialized for a first round of training (t=1) using the training examples. In an exemplary embodiment, the weight distribution is uniform over all training examples, i.e., $D_t = 1/m$.

General weight distribution over training set ($D_t$): $D_t$ on $\{1, \ldots, m\}$ Initial weight distribution over training set for first round ($D_t$): $D_t^* = 1/m$ In an exemplary embodiment, the method 1400 is over when T rounds are completed.

In step 1408, the method may determine whether T rounds have not been completed and if there are rounds left to complete. For example, the present round number is checked to determine if the total number of rounds has reached T. If the present round number is equal to or less than T, then the "Yes" branch is taken.

In step 1410, the weak learner may be trained using the weight distribution ($D_t$) to generate a hypothesis ($h_t$). In step 1412, the generated hypothesis ($h_t$), i.e., the classifier obtained after training, may be stored on a storage device.

$$h_t: X \to \{-1, +1\}$$

In step 1414, a confidence value ($\alpha_t$) is selected to minimize error.

$$\alpha_t \in R$$

In step 1416, the confidence value is used to compute an updated weight distribution to be used in the subsequent round.

$$D_{t+1}(i) = \frac{D_t(i) e^{-\alpha_t y_i h_t(x_i)}}{Z_t}$$

In step 1418, the present round is incremented by one.

$$t = t + 1$$

After the present round is incremented, the method returns to step 1408 to determine if a total of T rounds have been completed. If the present round is greater than T, then the "No" branch is taken.

In step 1420, upon completion of all of the rounds, a final result (H(x)) is determined based on the hypotheses ($h_t$) determined at each round. In an exemplary embodiment, the final result is a weighted sum of the hypotheses.

$$H(x) = \text{sign}(f(x)) = \text{sign}\left(\sum_{t=1}^{T} \alpha_t h_t(x)\right)$$

One of ordinary skill in the art will recognize that any suitable boosting system may be used to improve the accuracy of a weak learner in categorizing user-generated content as positive or negative examples of a selected category.

Exemplary Use of Exemplary Trained Machine Learning Systems

FIG. 15 is a flowchart showing an exemplary computer-implemented and computer-executable method 1500 according to exemplary embodiments for categorizing web page content generated by a user.

In step 1502, exemplary embodiments may receive the textual content.

In step 1504, exemplary embodiments may process the selected content to generate a vector that may be used by an exemplary trained machine learning system to determine whether the selected content is a positive example of a predefined binary category. In an exemplary embodiment, the vector may be generated in accordance with exemplary method 1300 illustrated in FIG. 13.

In step 1506, exemplary embodiments may parse the selected content to generate a sequence of one or more n-grams based on the selected content.

In step 1508, exemplary embodiments may remove one or more predefined stop words from the sequence of n-grams.

In step 1510, exemplary embodiments may look up in the features table the unique identifier for each n-gram generated based on the selected content, and generate a combination, for example, a concatenation, of the unique identifiers for the n-grams. In an exemplary embodiment, the combination of the unique identifiers may be used as a vector.

In step 1512, exemplary embodiments may run an exemplary trained machine learning system on the generated vector using an predefined set of optimal parameters, for example, an optimal learner, an optimal number of rules, an optimal error bound, and the like. The trained machine learning system may analyze the vector based on its prior training and generate the likelihood of the selected content being a positive example of the predefined category.

The likelihood indication generated by the machine learning system may take any suitable form including, but not limited to, a quantitative indication such as a fractional probability value (ranging from 0.0 for the strongest likelihood that the content is a negative example of the category to 1.0 for the strongest likelihood that the content is a positive example of the category), a percentage probability value (ranging from 0% for the strongest likelihood that the content is a negative example of the category to 100% for the strongest likelihood that the content is a positive example of the category), positive numbers for positive examples and negative numbers for negative examples, negative numbers for positive examples and positive numbers for negative examples, and the like.

The likelihood indication may also be any suitable range of numbers, for example, ranging from zero (for the strongest likelihood that the content is a negative example of the category) to any positive number, for example, 100 (for the strongest likelihood that the content is a positive example of the category), ranging from a negative number, for example, −100 (for the strongest likelihood that the content is a negative example of the category) to any positive number, for example, 100 (for the strongest likelihood that the content is a positive example of the category).

In an exemplary embodiment, any likelihood indication (for example, −50 to 50) may be transformed into a corresponding range of probabilities (for example, 0.0 to 1.0) for further processing.

One of ordinary skill in the art may recognize that inverse logic may be used in configuring the likelihood indication. For example, positive numbers may be used for negative examples and negative numbers may be used for positive examples.

In step 1514, exemplary embodiments may perform one or more actions in response to the indication of whether the selected content falls into the predefined category. FIG. 1 illustrates an exemplary method 100 that may be used to take one or more actions in response to an indication of whether a selected content falls into a predefined category.

III. EXEMPLARY COMPUTING DEVICES

Figure 16:
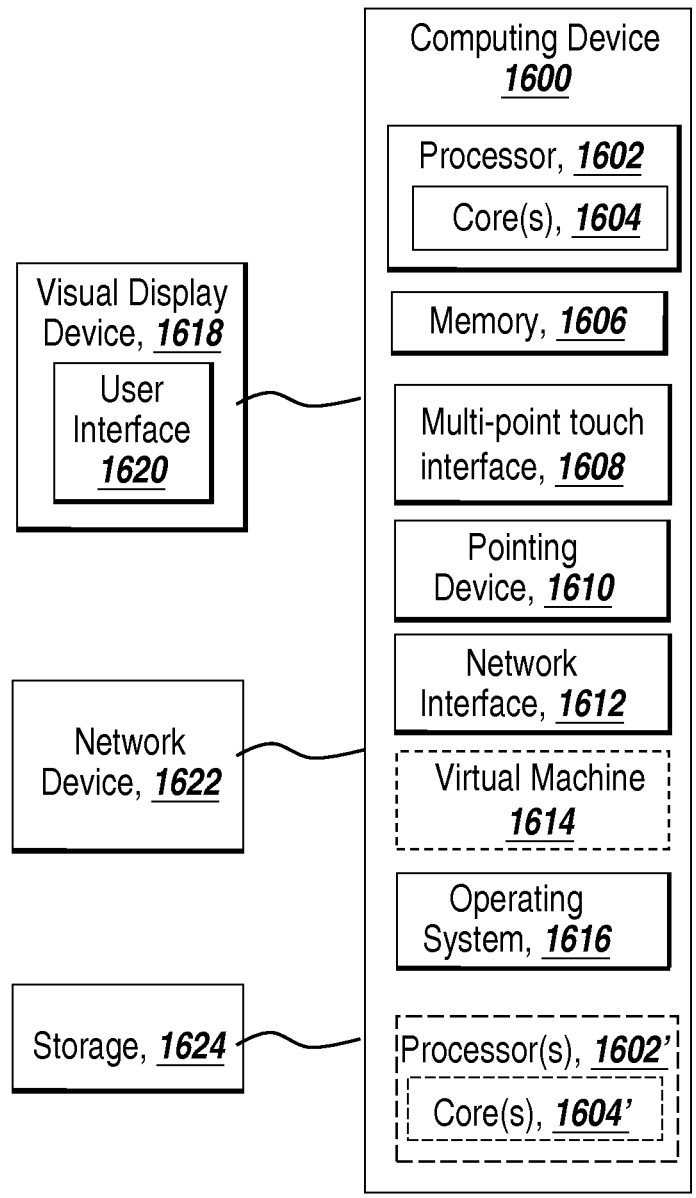
FIG. 16 is a block diagram of an exemplary computing device that may be used in to perform any of the exemplary methods disclosed herein.

FIG. 16 is a block diagram of an exemplary computing device 1600 that may be used in to perform any of the methods provided by exemplary embodiments. The computing device 1600 includes one or more non-transitory computer-readable media for storing one or more computer-executable instructions or software for implementing exemplary embodiments. The non-transitory computer-readable media may include, but are not limited to, one or more types of hardware memory, non-transitory tangible media, and the like. For example, memory 1606 included in the computing device 1600 may store computer-executable instructions or software for implementing exemplary embodiments. The computing device 1600 also includes processor 1602 and associated core 1604, and optionally, one or more additional processor(s) 1602' and associated core(s) 1604' (for example, in the case of computer systems having multiple processors/cores), for executing computer-executable instructions or software stored in the memory 1606, and other programs for controlling system hardware. Processor 1602 and processor(s) 1602' may each be a single core processor or multiple core (1604 and 1604') processor.

Virtualization may be employed in the computing device 1600 so that infrastructure and resources in the computing device may be shared dynamically. A virtual machine 1614 may be provided to handle a process running on multiple processors so that the process appears to be using only one computing resource rather than multiple computing resources. Multiple virtual machines may also be used with one processor.

Memory 1606 may include a computer system memory or random access memory, such as DRAM, SRAM, EDO RAM, and the like. Memory 1606 may include other types of memory as well, or combinations thereof.

A user may interact with the computing device 1600 through a visual display device 1618, such as a computer monitor, which may display one or more user interfaces 1620 or any other interface. The visual display device 1618 may also display other aspects, elements and/or information or data associated with exemplary embodiments. The computing device 1600 may include other 110 devices such a keyboard or a multi-point touch interface 1608 and a pointing device 1610, for example a mouse, for receiving input from a user. The keyboard 1608 and the pointing device 1610 may be connected to the visual display device 1618. The computing device 1600 may include other suitable conventional 110 peripherals. The computing device 1600 may also include a storage device 1624, such as a hard-drive, CD-ROM, or other computer readable media, for storing data and computer-readable instructions or software that implement exemplary embodiments.

The computing device 1600 may include a network interface 1612 configured to interface via one or more network devices 1622 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 1612 may include a built-in network adapter, network interface card, PCMCIA network card, card bus network adapter, wireless network adapter, USB network adapter, modem or any other device suitable for interfacing the computing device 1600 to any type of network capable of communication and performing the operations described herein. Moreover, the computing device 1600 may be any computer system, such as a workstation, desktop computer, server, laptop, handheld computer or other form of computing or telecommunications device that is capable of communication and that has sufficient processor power and memory capacity to perform the operations described herein.

The computing device 1600 may run any operating system 1616, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device and performing the operations described herein. In exemplary embodiments, the operating system 1616 may be run in native mode or emulated mode. In an exemplary embodiment, the operating system 1616 may be run on one or more cloud machine instances.

IV. EXEMPLARY NETWORK ENVIRONMENTS

Figure 17:
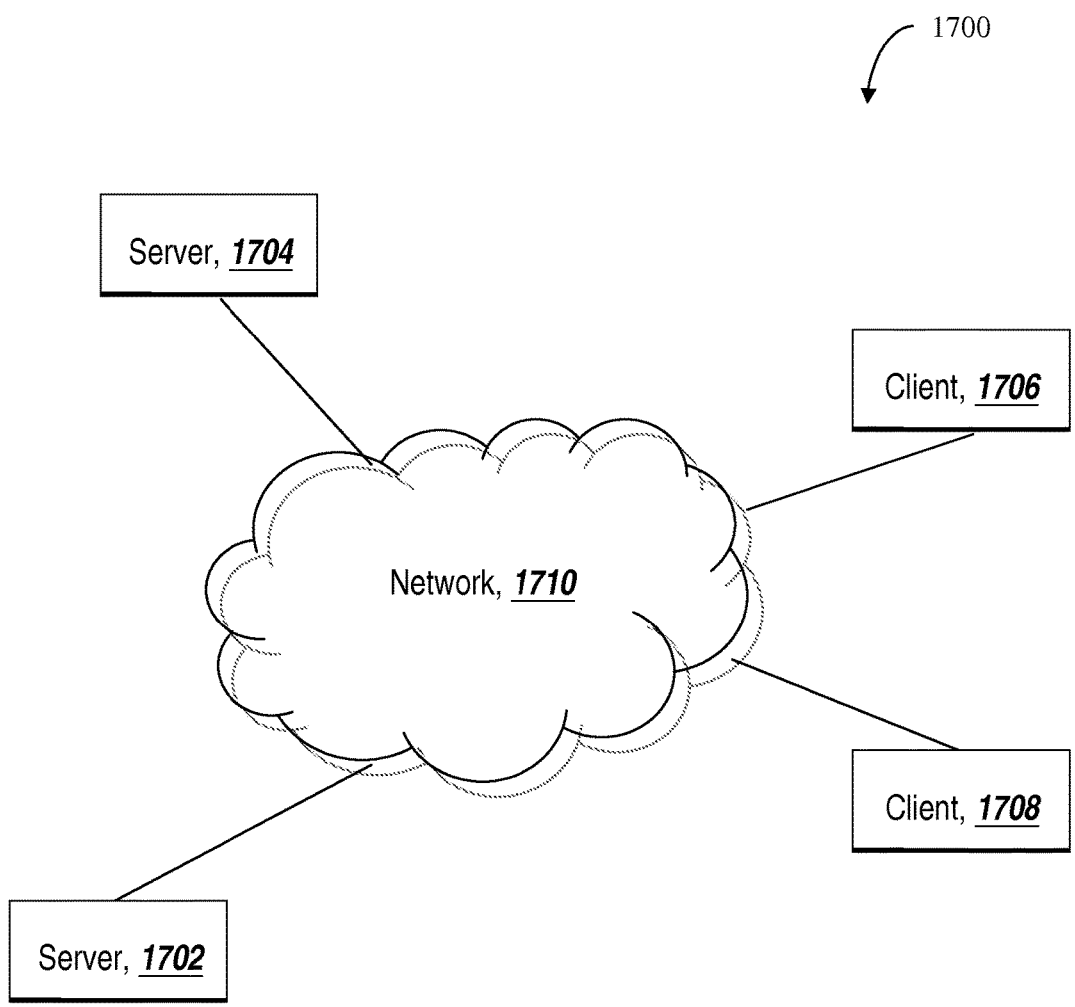
FIG. 17 is diagram of an exemplary network environment suitable for a distributed implementation of exemplary embodiments.

FIG. 17 is an exemplary network environment 1700 suitable for a distributed implementation of exemplary embodiments. The network environment 1700 may include one or more servers 1702 and 1704 coupled to one or more clients 1706 and 1708 via a communication network 1710. The network interface 1612 and the network device 1622 of the computing device 1600 enable the servers 1702 and 1704 to communicate with the clients 1706 and 1708 via the communication network 1710. The communication network 1710 may include, but is not limited to, the Internet, an intranet, a LAN (Local Area Network), a WAN (Wide Area Network), a MAN (Metropolitan Area Network), a wireless network, an optical network, and the like. The communication facilities provided by the communication network 1710 is capable of supporting distributed implementations of exemplary embodiments.

In an exemplary embodiment, the servers 1702 and 1704 may provide the clients 1706 and 1708 with computer-readable and/or computer-executable components or products under a particular condition, such as a license agreement. The computer-readable and/or computer-executable components or products may include those for providing and implementing an exemplary machine learning system. The clients 1706 and 1708 may train and test an exemplary machine learning system using the computer-readable and/or computer-executable components and products provided by the servers 1702 and 1704, and submit the trained machine learning system to the servers 1702 and 1704 for using the trained machine learning system to moderate user-generated web page content.

Alternatively, in another exemplary embodiment, the clients 1706 and 1708 may provide the servers 1702 and 1704 with computer-readable and/or computer-executable components or products under a particular condition, such as a license agreement. The computer-readable and/or computer-executable components or products may include those for providing and implementing an exemplary machine learning system. The servers 1702 and 1704 may train and test an exemplary machine learning system using the computer-readable and/or computer-executable components and products provided by the clients 1706 and 1708, and submit the trained machine learning system to the clients 1706 and 1708 for using the trained machine learning system to moderate user-generated web page content.

V. INCORPORATION BY REFERENCE

The contents of all references, including patents and patent applications, cited throughout this application are hereby incorporated herein by reference in their entirety. The appropriate components and methods of those references may be selected for the invention and embodiments thereof. Still further, the components and methods identified in the Background section are integral to this disclosure and may be used in conjunction with or substituted for components and methods described elsewhere in the disclosure within the scope of the invention.

VI. EQUIVALENTS

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements or method steps, those elements or steps may be replaced with a single element or step. Likewise, a single element or step may be replaced with a plurality of elements or steps that serve the same purpose. Further, where parameters for various properties are specified herein for exemplary embodiments, those parameters may be adjusted up or down by 1/20th, 1/10th, 1/5th, 1/3rd, 1/2, and the like, or by rounded-off approximations thereof, unless otherwise specified. Moreover, while exemplary embodiments have been shown and described with references to particular embodiments thereof, those of ordinary skill in the art will understand that various substitutions and alterations in form and details may be made therein without departing from the scope of the invention. Further still, other aspects, functions and advantages are also within the scope of the invention.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than shown.

What is claimed is:

1. An apparatus, comprising:
a storage device that stores a set of instructions; and
at least one processor coupled to the storage device and configured to execute the set of instructions to:
receive, over a network, at least a portion of textual data input from a user interface;
compute a numeric likelihood that the received portion of textual data falls into a category unsuitable for publication on a web page;
determine whether to electronically publish the received portion of textual data on the web page based on a comparison of the computed numeric likelihood to a threshold value associated with the category, wherein the threshold value includes a numeric likelihood assigned to reference content suitable for publication on the web page and the comparison comprises determining whether the computed numeric likelihood exceeds the threshold value; and
generate an electronic command to publish the textual data on the web page, when the computed numeric likelihood is determined not to exceed the threshold value.

2. The apparatus of claim 1, wherein the received textual data is generated by a user, and the at least one processor is further operative with the set of instructions to assign, to the user, a value indicative of a capability of the user to generate content suitable for publication on the web page.

3. The apparatus of claim 2, wherein the at least one processor is further operative with the set of instructions to establish that the textual data is unsuitable for publication on the web page based on the assigned value indicative of a capability of the user to generate content suitable for publication on the web page.

4. The apparatus of claim 1, wherein the at least one processor is further operative with the set of instructions to, when the computed numeric likelihood is determined to exceed the threshold value, determine whether the computed numeric likelihood exceeds an additional threshold value.

5. The apparatus of claim 4, wherein the at least one processor is further operative with the set of instructions to establish that the textual data is unsuitable for publication on the web page, when the computed numeric likelihood is determined to exceed the additional threshold value.

6. The apparatus of claim 1, wherein the at least one processor is further operative with the set of instructions to:
parse the textual data into a plurality of n-grams; and
compute the numeric likelihood based on an application of a machine-learning algorithm to the plurality of n-grams.

7. The apparatus of claim 1, wherein:
the textual data comprises a comment generated by a user for publication on the web page.

8. A computer-implemented method, comprising:
receiving, over a network, at least a portion of textual data input from a user interface;
computing, using at least one processor, a numeric likelihood that textual data falls into a category unsuitable for publication on a web page;
determining, using the at least one processor, whether to electronically publish the received portion of textual data on the web page based on a comparison of the computed numeric likelihood to a threshold value associated with the category, wherein the threshold value includes a numeric likelihood assigned to reference content suitable for publication on the web page and the comparison comprises determining whether the computed numeric likelihood exceeds the threshold value; and
generating an electronic command to publish the textual data on the web page, when the computed numeric likelihood is determined not to exceed the threshold value.

9. The method of claim 8, wherein the received textual data is generated by a user, and the method further comprises assigning, to the user, a value indicative of a capability of the user to generate content suitable for publication on the web page.

10. The method of claim 9, further comprising:
establishing that the textual data is unsuitable for publication on the web page based on the assigned value indicative of a capability of the user to generate content suitable for publication on the web page.

11. The method of claim 8, further comprising, when the computed numeric likelihood is determined to exceed the threshold value, determining whether the computed numeric likelihood exceeds an additional threshold value.

12. The method of claim 11, further comprising establishing that the textual data is unsuitable for publication on the web page, when the computed numeric likelihood is determined to exceed the additional threshold value.

13. The method of claim 8, further comprising:
parsing the textual data into a plurality of n-grams; and computing the numeric likelihood based on an application of a machine-learning algorithm to the plurality of n-grams.

14. The method of claim 8, wherein:
the textual data comprises a comment generated by a user for publication on the web page.

15. A tangible, non-transitory computer-readable medium that stores a set of instructions that, when executed by at least one processor, cause the at least one processor to perform operations comprising:
receiving, over a network, at least a portion of textual data input from a user interface;
computing, using at least one processor, a numeric likelihood that textual data falls into a category unsuitable for publication on a web page;
determining, using the at least one processor, whether to electronically publish the received portion of textual data on the web page based on a comparison of the computed numeric likelihood to a threshold value associated with the category, wherein the threshold value includes a numeric likelihood assigned to reference content suitable for publication on the web page and the comparison comprises determining whether the computed numeric likelihood exceeds the threshold value; and
generating an electronic command to publish the textual data on the web page, when the computed numeric likelihood is determined not to exceed the threshold value.

16. The computer-readable medium of claim 15, wherein the received textual data is generated by a user, and the set of instructions further cause the at least one processor to assign, to the user, a value indicative of a capability of the user to generate content suitable for publication on the web pager.

17. The computer-readable medium of claim 16, wherein the set of instructions further cause the at least one processor to:
establish that the textual data is unsuitable for publication on the web page based on the assigned value indicative of a capability of the user to generate content suitable for publication on the web page.

18. The computer-readable medium of claim 15, further comprising, when the computed numeric likelihood is determined to exceed the threshold value, determining whether the computed numeric likelihood exceeds an additional threshold value.

19. The computer-readable medium of claim 18, further comprising establishing that the textual data is unsuitable for publication on the web page, when the computed numeric likelihood is determined to exceed the additional threshold value.

20. The computer-readable medium of claim 15, further comprising:
parsing the textual data into a plurality of n-grams; and computing the numeric likelihood based on an application of a machine-learning algorithm to the plurality of n-grams.

* * * * *